(12) United States Patent
Semba et al.

(10) Patent No.: US 10,007,831 B2
(45) Date of Patent: Jun. 26, 2018

(54) INFORMATION PROCESSING APPARATUS, BIOMETRIC AUTHENTICATION METHOD, AND RECORDING MEDIUM

(71) Applicant: FUJITSU LIMITED, Kawasaki-shi, Kanagawa (JP)

(72) Inventors: Satoshi Semba, Kawasaki (JP); Soichi Hama, Atsugi (JP); Satoshi Maeda, Atsugi (JP); Hajime Nada, Kawasaki (JP); Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 15/283,536

(22) Filed: Oct. 3, 2016

(65) Prior Publication Data

US 2017/0147863 A1    May 25, 2017

(30) Foreign Application Priority Data

Nov. 20, 2015   (JP) ................................ 2015-228233

(51) Int. Cl.
*G06K 9/00* (2006.01)
*H04N 5/232* (2006.01)

(52) U.S. Cl.
CPC ..... *G06K 9/00087* (2013.01); *G06K 9/00013* (2013.01); *H04N 5/23212* (2013.01); *H04N 5/23293* (2013.01)

(58) Field of Classification Search
CPC .......... G06C 20/3821; G06Q 20/40145; H04L 63/0861; H04L 63/08
USPC ....... 382/115, 116, 124, 209, 218, 278, 282; 340/5.52, 5.81, 5.82, 5.83
See application file for complete search history.

(56) References Cited

U.S. PATENT DOCUMENTS 6,879,344 B1 * 4/2005 Nakamura ........... H04N 5/2351
348/221.1
7,224,391 B2 * 5/2007 Kimura .............. H04N 5/35536
250/208.1

(Continued)

FOREIGN PATENT DOCUMENTS

EP    2830002 A2    1/2015
EP    3091480 A1    11/2016

(Continued)

OTHER PUBLICATIONS

Extended European Search Report dated Apr. 10, 2017 for corresponding European Patent Application No. 16191376.9, 5 pages.

*Primary Examiner* — Yosef Kassa
(74) *Attorney, Agent, or Firm* — Fujitsu Patent Center

(57) ABSTRACT

An information processing apparatus includes a touch panel; a camera; and a processor coupled to the touch panel and the camera and configured to: display first guide information on the touch panel, display second guide information at a location different from a location of the first guide information on the touch panel when an operation to the first guide information is detected, acquire a plurality of images of a first palm photographed during a period from when a finger touching to the first guide information has been detected to when a finger touching to the second guide information has been detected, and extract a first authentication image for use in authentication of a user from the plurality of images of the first palm.

10 Claims, 24 Drawing Sheets

(56) References Cited

U.S. PATENT DOCUMENTS

| | | | | |
|---|---|---|---|---|
| 7,365,750 B2* | 4/2008 | Yamazaki | ............ | G06K 9/0004 |
| | | | | 345/104 |
| 7,525,523 B2* | 4/2009 | Yamazaki | ......... | H01L 27/14678 |
| | | | | 345/207 |
| 8,103,069 B2* | 1/2012 | Asano | ................ | G06K 9/00013 |
| | | | | 382/115 |
| 8,314,642 B2* | 11/2012 | Kurokawa | ............... | H03K 5/04 |
| | | | | 327/172 |
| 8,463,669 B2* | 6/2013 | Cacheria, III | ..... | G06Q 10/1057 |
| | | | | 705/32 |
| 8,588,478 B2* | 11/2013 | Makimoto | ......... | G06K 9/00013 |
| | | | | 382/116 |
| 8,624,875 B2* | 1/2014 | Kurokawa | .............. | G06F 3/042 |
| | | | | 345/173 |
| 8,982,099 B2* | 3/2015 | Kurokawa | ............ | G06F 3/0416 |
| | | | | 345/175 |

FOREIGN PATENT DOCUMENTS

| | | |
|---|---|---|
| JP | 2007-122164 | 5/2007 |
| JP | 2007-159762 | 6/2007 |
| JP | 2013-105222 | 5/2013 |

* cited by examiner

INFORMATION PROCESSING APPARATUS, BIOMETRIC AUTHENTICATION METHOD, AND RECORDING MEDIUM

CROSS-REFERENCE TO RELATED APPLICATION

This application is based upon and claims the benefit of priority of the prior Japanese Patent Application No. 2015-228233, filed on Nov. 20, 2015, the entire contents of which are incorporated herein by reference.

FIELD

The embodiments discussed herein are related to an information processing apparatus, a biometric authentication method, and a recording medium.

BACKGROUND

Information security has recently drawn world attention, and information processing apparatuses that perform biometric authentication of a user using biometric information (user authentication) are now in widespread use. Since an information processing apparatus with a biometric authentication function remains unusable unless user authentication is not successful, information leakage to a third party is controlled.

Examples of biometric information include vein authentication based on veins in the palm of a person, finger print authentication using the fingerprint, and iris authentication using the iris in the pupil. From among these authentication methods, the palm vein authentication is used in automatic teller machines (ATMs) of financial institutions. For example, related art techniques are disclosed in Japanese Laid-open Patent Publication No. 2007-122164, Japanese Laid-open Patent Publication No. 2007-159762, and Japanese Laid-open Patent Publication No. 2013-105222.

Since the palm vein authentication reads information of veins typically present deep from the palm skin of the human hand, its biometric information is more difficult to falsify than that of the fingerprint authentication or the iris authentication. The introduction of the function of vein authentication is thus desirable not only in a stationary information processing apparatus, such as ATM, but also a portable information processing apparatus (mobile terminal apparatus), such as a smart phone or a tablet. The vein authentication is desirably implemented in a simple configuration.

SUMMARY

According to an aspect of the invention, an information processing apparatus includes a touch panel; a camera; and a processor coupled to the touch panel and the camera and configured to: display first guide information on the touch panel, display second guide information at a location different from a location of the first guide information on the touch panel when an operation to the first guide information is detected, acquire a plurality of images of a first palm photographed during a period from when a finger touching to the first guide information has been detected to when a finger touching to the second guide information has been detected, and extract a first authentication image for use in authentication of a user from the plurality of images of the first palm.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the disclosure are specifically described with reference to FIG. 1 through FIG. 19.

Figure 1:
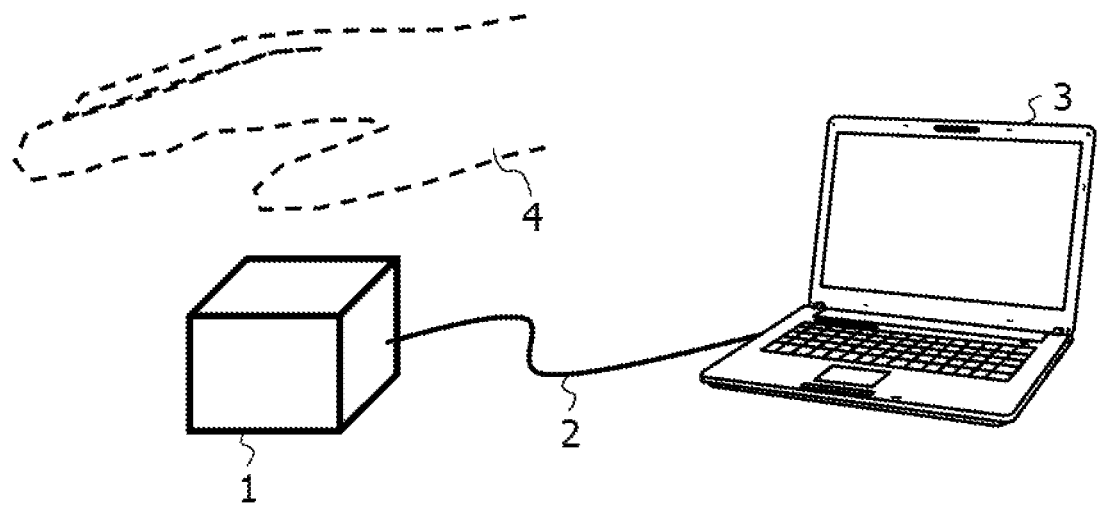
FIG. 1 is an example of a palm vein authentication system.

FIG. 1 is an example of a palm vein authentication system. As illustrated in FIG. 1, the palm vein authentication system includes a palm vein sensor 1, a cable 2, and a computer 3. The palm vein sensor 1 is a cube having each side of about 5 cm, and is electrically connected to the computer 3 via the cable 2. The palm vein sensor 1 includes a camera (not illustrated) to photograph of a palm 4. By holding the palm 4 over the palm vein sensor 1, the camera photographs veins of the palm 4.

Figure 2A:
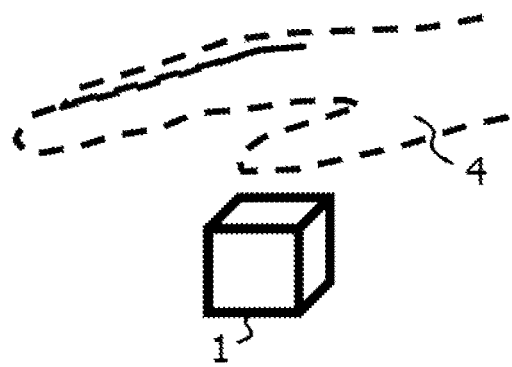
FIG. 2A and FIG. 2B illustrate an example of how a palm is to be held over a palm vein sensor.
Figure 2B:
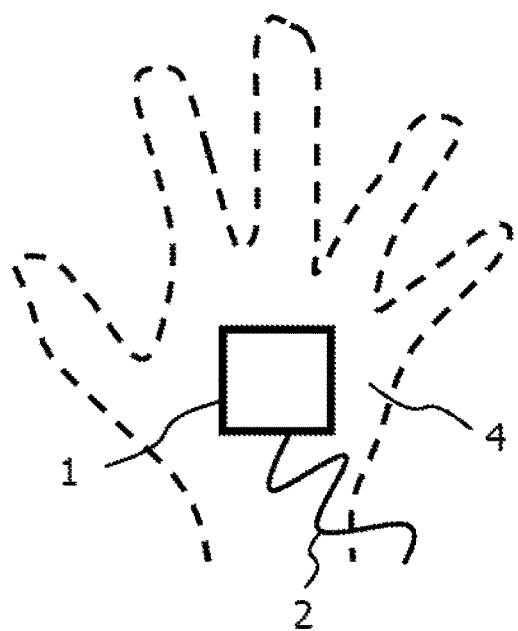

FIG. 2A and FIG. 2B illustrate an example of how the palm 4 is to be held over the palm vein sensor 1. As illustrated in FIG. 2A, when the palm 4 is held over the palm vein sensor 1, the palm 4 is held at a location right above the palm vein sensor 1 such that the palm 4 is generally in parallel with the top surface of the palm vein sensor 1. As illustrated in FIG. 2B, the user holds their palm 4 such that the palm vein sensor 1 is aligned with the center of their palm 4.

The user holds the palm 4 over the palm vein sensor 1 in this way, and the palm vein sensor 1 photographs the palm 4 using the camera. The image of the photographed palm 4 is sent from the palm vein sensor 1 to the computer 3 via the cable 2. The computer 3 performs image processing on the received image of the palm 4, thereby converting the image into palm biometric information for matching, including information of veins. The computer 3 compares the matching palm biometric information with the palm biometric information pre-registered on the computer 3, thereby performing authentication. The palm vain authentication is thus performed.

The user is requested to have a slight level of skill to hold the plan 4 over the palm vein sensor 1 in a correct way. A hand placement guide to secure the palm 4 at a location above the palm vein sensor 1 may be sometimes used such that the user may hold the palm 4 over the palm vein sensor 1 in a correct way.

Figure 3:
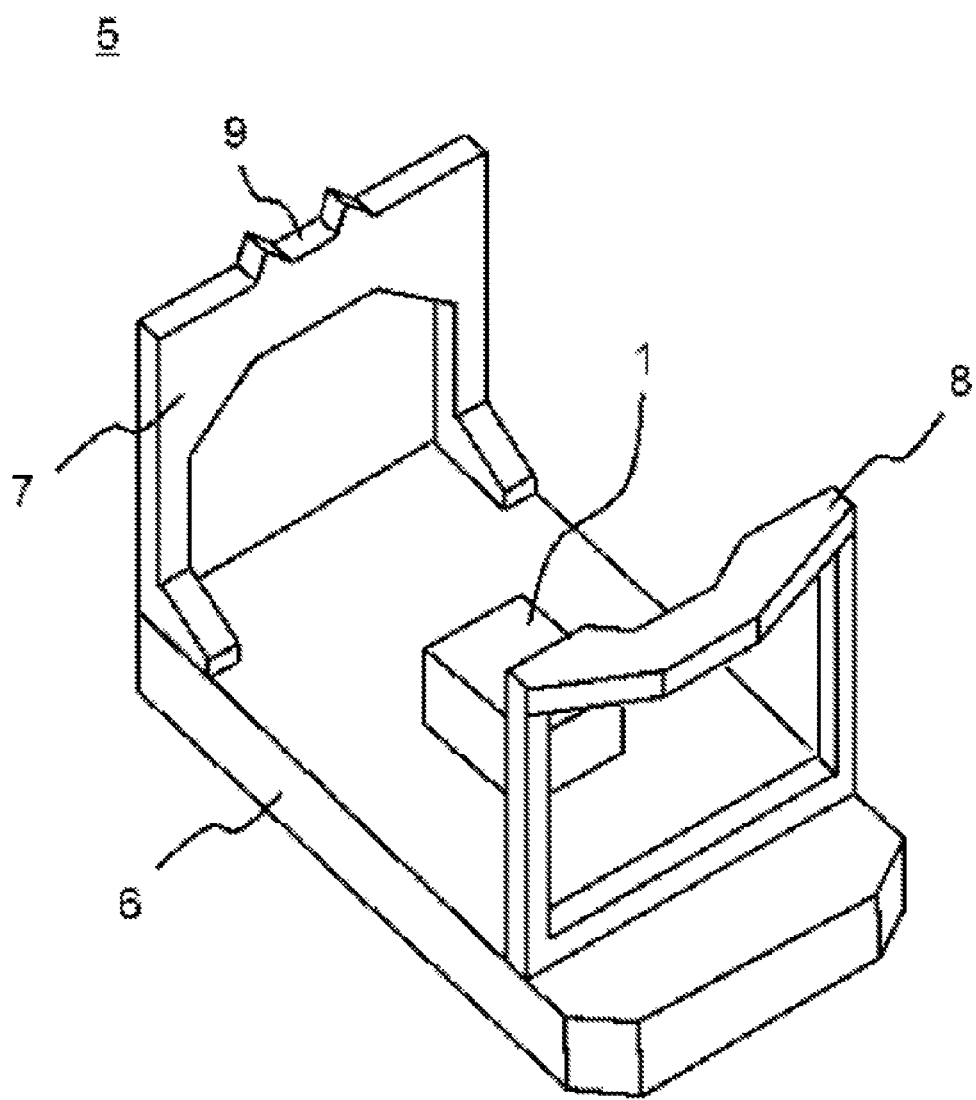
FIG. 3 illustrates an example of a hand placement guide.

FIG. 3 illustrates an example of a hand placement guide 5. As illustrated in FIG. 3, the hand placement guide 5 includes a base 6, a finger receiving arm 7, and a wrist receiving arm 8. The finger receiving arm 7 and the wrist receiving arm 8 are fixed on the base 6 with a specific spacing allowed therebetween. The palm vein sensor 1 is disposed between the finger receiving arm 7 and the wrist receiving arm 8 on the base 6. When the palm 4 holds above the palm vein sensor 1, the user places their finger on the finger receiving arm 7 first. In this case, by placing the middle finger in a cutout 9 of the finger receiving arm 7, the palm 4 may be easily held. The user then places their wrist on the wrist receiving arm 8 with the middle finger received on the finger receiving arm 7. In this way, the palm 4 is fixed above the palm vein sensor 1 and the palm vein authentication is accurately performed.

The inventor has found three problems in introducing the palm vein authentication function into the mobile terminal apparatus.

The first problem is that using the hand placement guide is difficult. The mobile terminal apparatus is smaller than the stationary information processing apparatus, and is thus easy to carry. However, if the mobile terminal apparatus is carried together with the hand placement guide almost as large as the mobile terminal apparatus, the mobile terminal apparatus is no longer portable.

The second problem is that close-range photographing is even more difficult as the mobile terminal apparatus has a flatter structure. The mobile terminal apparatus becomes flatter in structure as the size thereof becomes smaller. Many of mobile terminal apparatuses sold in 2014 have a thickness thinner than 10 mm. The camera module housed in such an apparatus is naturally thinner than 10 mm. In view of the thickness of a cover covering the camera module, the camera module may be 5 to 7 mm thick.

A lens housed in the camera module is also subject to such thickness constraints. If the mobile terminal apparatus is as thick as 5 to 7 mm, it is difficult to employ a zoom lens unit including multiple lenses. As a result, it is difficult to photograph the palm within a close range from the mobile terminal apparatus. If an attempt is made to photograph the palm within a close range from the mobile terminal apparatus, the resulting image is blurred, and the effective resolution is lowered.

The third problem is that it is difficult to ensure a photographing area as the mobile terminal apparatus becomes thinner. In the palm vein authentication, a wide-angle lens is desirable to photograph a wide area of the palm. The same is true when the palm vein authentication function is introduced in the mobile terminal apparatus. If the thickness of the mobile terminal apparatus is subject to the above-described constraints, the use of a wide-angle lens is difficult, and the area of the palm that is photographed may be limited.

The embodiments address the three problems. The embodiments of the disclosure are described below.

Figure 4:
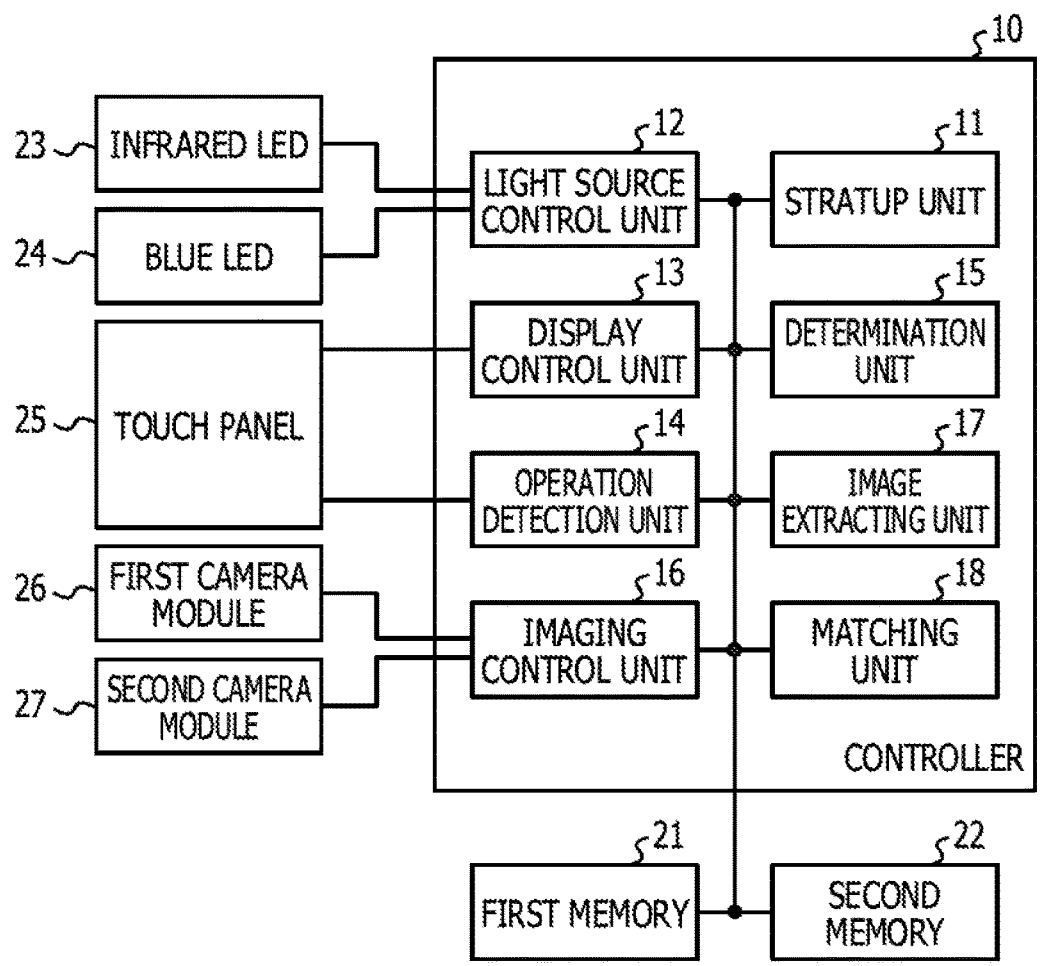
FIG. 4 is a functional block diagram of an information processing apparatus of a first embodiment.

FIG. 4 is a functional block diagram of the information processing apparatus 100 of a first embodiment. The information processing apparatus 100 may be one of mobile terminal apparatuses including a smart phone, a tablet, and a notebook personal computer (PC). The disclosure is not limited to those apparatuses, and may be applicable to a general-purpose information processing apparatus. As illustrated in FIG. 4, the information processing apparatus 100 includes a controller 10, a first memory 21, a second memory 22, an infrared LED 23, a blue LED 24, a touch panel 25, a first camera module 26, and a second camera module 27. Those elements are described below.

The controller 10 is a hardware device that generally controls the information processing apparatus 100. The controller 10 includes a startup unit 11, a light source control unit 12, a display control unit 13, an operation detection unit 14, a determination unit 15, an imaging control unit 16, an image extracting unit 17, and a matching unit 18.

The startup unit 11 starts up a matching application for user authentication.

The light source control unit 12 performs on-off control on the infrared LED 23 and the blue LED 24. The on-off control is described below.

The display control unit 13 performs display control to display an icon or text on the touch panel 25.

The operation detection unit 14 detects an operation performed on the touch panel 25 by receiving an indication of a touching operation of an object, such as a finger, on an operation surface of the touch panel 25.

The determination unit 15 performs a variety of determination operations performed in the process of the information processing apparatus 100.

The imaging control unit 16 controls the photographing operations performed by the first camera module 26 and the second camera module 27.

The image extracting unit 17 selects two matching images (a first matching image and a second matching image) of palm veins for use in palm vain authentication, from among multiple images taken by the first camera module 26. The selection method of the two matching images performed by the image extracting unit 17 is described below.

The matching unit 18 verifies each of the two matching images selected by the image extracting unit 17 with pre-registered multiple registration images. The matching unit 18 has a function of unlocking the information processing apparatus 100 if the matching has been successful.

The first memory 21 is a non-volatile storage device (hardware) that stores information and programs used in the process of the controller 10. The first memory 21 may include multiple storage devices, depending on applications and a storage capacity in use.

The second memory 22 is a volatile storage device (hardware) that stores a variety of information used in the process of the disclosure. Like the first memory 21, the second memory 22 may include multiple storage devices, depending on applications and a storage capacity in use.

The infrared LED 23 is connected to the light source control unit 12, and is a light source that emits a near infrared light beam to the palm. The information processing apparatus 100 causes the infrared LED 23 to light to irradiate the palm 4 with the infrared light beam and thus photographs the image of the veins of the palm. The image of a red component (R component) extracted from the image of the palm 4 photographed by the infrared LED 23 is hereinafter referred to as a "red plane". The red plane is an example of the image of a first palm and the image of a second palm.

The blue LED 24 is connected to the light source control unit 12 and is a light source that emits a blue light beam of shorter wavelength to the palm 4. The blue light beam emitted from the blue LED 24 is a spot light with the irradiation area thereof converged. The information processing apparatus 100 causes the blue LED 24 to light to emit the blue light beam to the palm 4, and photographs the image of the light spot. The image of a blue component (B component) extracted from the image of the light spot photographed by the blue LED 24 is hereinafter referred to as a "blue plane".

The blue LED 24 is designed so that a pattern of the light spot projected on the blue plane is different depending on the height of from the touch panel 25. In accordance with the present embodiment, the blue plane in a better in-focus state to be used for the palm vein authentication is searched among acquired vein images of the palm. The specific search method is described below. The blue plane is an example of a light spot image.

The touch panel 25 is an input device having an operation surface, and operates the information processing apparatus 100 by allowing the user to touch the operation surface with their finger. The touch panel 25 senses the touching of multiple fingers together with corresponding location coordinates. In mobile terminal apparatuses today, a multi-touch sensor that is capable of receiving multiple touches is widely used for the touch panel 25. The touch panel 25 is connected to the display control unit 13 and the operation detection unit 14 in the controller 10. When a touching operation is detected on the operation surface, the touch panel 25 sends detected contents to the operation detection unit 14.

The first camera module 26, connected to the imaging control unit 16, is disposed such that the lens of the first camera module 26 is visible through a window disposed on the surface of the information processing apparatus 100 that is flush with the exposed operation surface of the touch panel 25. The first camera module 26 may be used to photograph the user's own face, or the red plane or the blue plane for use in the palm vein authentication.

The second camera module 27 is connected to the imaging control unit 16. The second camera module 27 is disposed such that the lens of the second camera module 27 is visible through a window disposed on the surface of the information processing apparatus 100 opposite from the operation surface of the touch panel 25. The second camera module 27 may be used to photograph a landscape or a person. The second camera module 27 typically provides a higher quality image than the first camera module 26.

A hardware configuration of the information processing apparatus 100 is described below.

Figure 5:
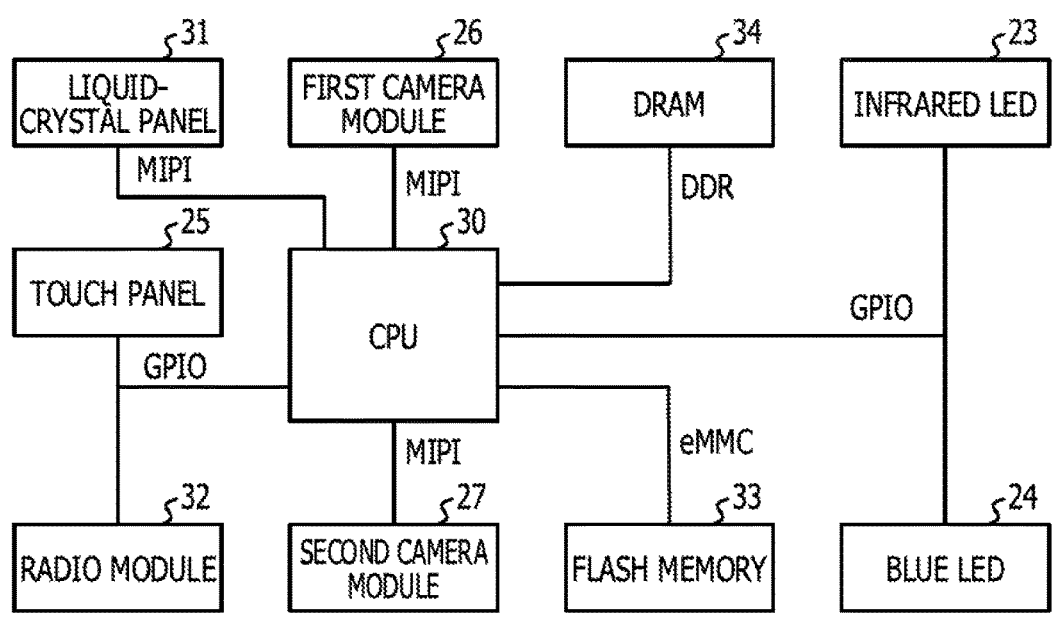
FIG. 5 illustrates a hardware configuration of the information processing apparatus of the first embodiment.

FIG. 5 illustrates a hardware configuration of the information processing apparatus 100 of the first embodiment. Referring to FIG. 5, the information processing apparatus 100 includes a central processing unit (CPU) 30, an infrared light emitting diode (LED) 23, a blue LED 24, a touch panel 25, a first camera module 26, a second camera module 27, a liquid-crystal panel 31, a radio module 32, a flash memory 33, a dynamic random-access memory (DRAM) 34, and the like. Hardware elements similar to those of FIG. 4 are designated with the same reference numerals.

The CPU 30 is a processor that performs a process to generally control the information processing apparatus 100. The CPU 30 is an example of the controller 10 of FIG. 4, and the operations of the functional blocks of the controller 10 are implemented by the CPU 30.

The infrared LED 23 is connected to the CPU 30 via general-purpose input-output (GPIO). The CPU 30 on-off controls the infrared LED 23 in the emission of near infrared light beams. As described below, the information processing apparatus 100 includes two infrared LEDs 23 (an infrared LED 23a and an infrared LED 23b).

The blue LED 24 is connected to the CPU 30 via GPIO. The CPU 30 on-off controls the blue LED 24 in the emission of blue light beams. As described below, the information processing apparatus 100 includes two blue LEDs 24 (a blue LED 24a and a blue LED 24b).

The liquid-crystal panel 31 includes a glass substrate, a polarizing filter, liquid crystal, and a back light, and displays an image. The liquid-crystal panel 31 is disposed on the rear side of the touch panel 25. The liquid-crystal panel 31 is connected to the CPU 30 via mobile industry processor interface (MIPI). The liquid-crystal panel 31, controlled by the display control unit 13, displays an image including an icon and text, on the operation surface of the touch panel 25.

The touch panel 25 is connected to the CPU 30 via GPIO. The touch panel 25 is controlled by the CPU 30, and has a function of identifying a touch location of a finger or the like. The touch panel 25 has two intersecting lines of electrode in the operation surface. The operation surface is segmented by grids, and multiple areas defined by the grids are referred to as cells. Each intersection point of two electrodes corresponds to one cell. If a finger touches the operation surface, capacitance between the electrodes corresponding to the touch location changes. In this way, one or more cells responsive to the intersection points where capacitance changes are identified. The touch location is thus identified. Information concerning the touch location is sent to the CPU 30.

The first camera module 26 and the second camera module 27 are electronic elements that are used to photograph the outside as described above. The first camera module 26 and the second camera module 27 are connected to the CPU 30 via MIPI.

The radio module 32 is a hardware element that connects to an external terminal apparatus via the Internet. The radio module 32 is a radio wide area network (WAN) module complying with communication standards, such as third generation (3G), or 3G long term evolution (LTE), or a radio local area network (LAN) module complying with communication standards, such as Wi-Fi (registered trademark).

The flash memory 33 is a non-volatile storage device that stores a program to control the operation of the information processing apparatus 100 (including a biometric authentication program). The flash memory 33 is connected to the CPU 30 via an embedded multimedia card (eMMC) interface. The flash memory 33 also stores data of a database, and data that is desirably stored even when power is down. The flash memory 33 is an example of the first memory 21 of FIG. 4.

The DRAM 34 is a volatile storage device that serves as a memory area of data when programs, an operating system (OS), or a variety of programs are executed. The DRAM 34 is an example of the second memory 22 of FIG. 4.

Figure 6:
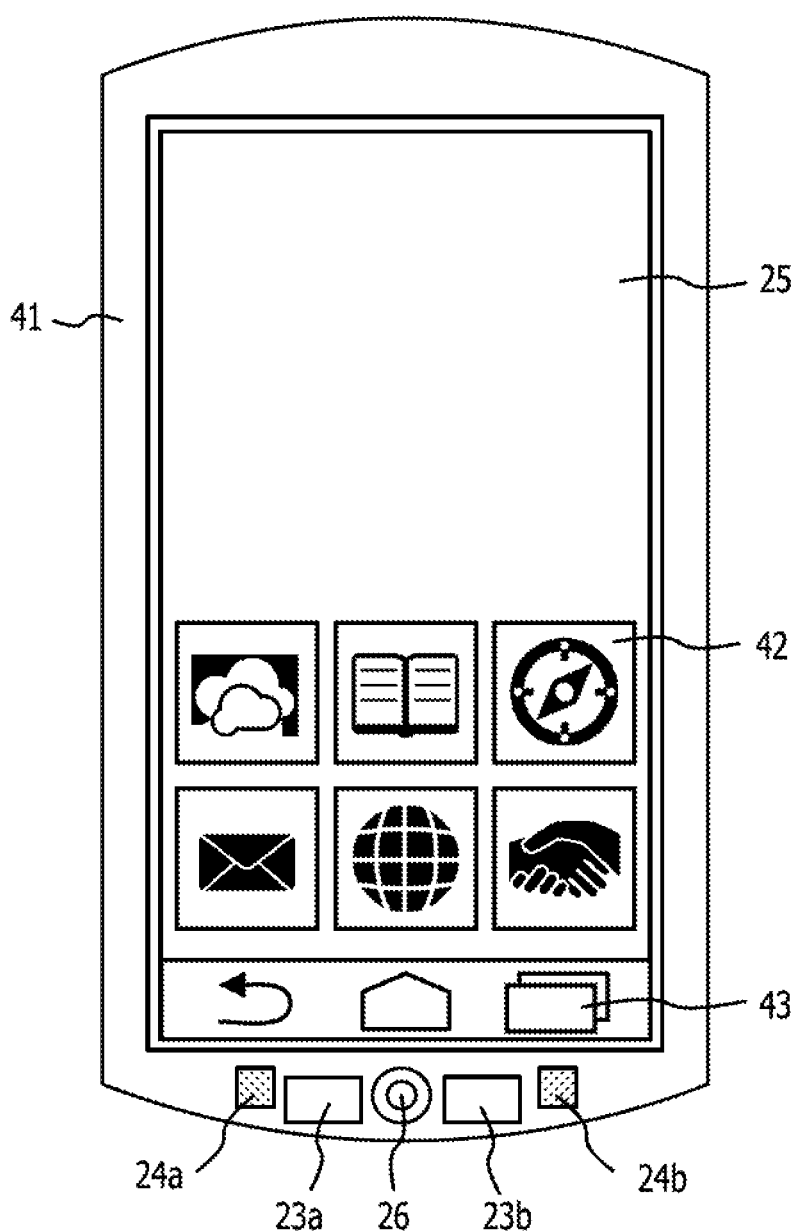
FIG. 6 illustrates an example of a top view of the information processing apparatus of the first embodiment.

FIG. 6 illustrates an example of the top view of the information processing apparatus 100 of the first embodiment. Hardware elements identical to those of FIG. 5 are designated with the same reference numerals. In the following discussion of the X-Y coordinates, the direction indicated by the arrow of X, namely, the direction of increase of the value in the X coordinate, is defined to be "right" and the direction opposite to the direction indicated by the arrow of X, namely, the direction of decrease of the value in the X coordinate, is defined to be "left". The direction indicated by the arrow of Y, namely, the direction of increase of the value in the Y coordinate, is defined to be "up" and the direction opposite to the direction indicated by the arrow of Y, namely, the direction of decrease of the value in the Y coordinate, is defined to be "down". Referring to FIG. 6, the information processing apparatus 100 includes a body 41, the touch panel 25, the first camera module 26, and the infrared LEDs 23a and 23b, and the blue LEDs 24a and 24b.

The touch panel 25 is exposed from the top surface of the body 41. An image, an icon, and text are displayed on the operation surface of the touch panel 25. In the example of FIG. 6, the touch panel 25 displays on the operation surface thereof icons 42 to execute an application, and icons 43 to operate the body 41. The first camera module 26 is housed inside the body 41 in the center of a lower edge portion below the touch panel 25. The first camera module 26 may photograph the outside through a transparent window disposed in the body 41. The center position is appropriate for the first camera module 26 to photograph veins of the palm.

The infrared LEDs 23a and 23b are disposed below the touch panel 25 inside the body 41 with the first camera module 26 located therebetween. The blue LEDs 24a and 24b are disposed below the touch panel 25 inside the body 41. The blue LEDs 24a and 24b are respectively disposed next to the infrared LEDs 23a and 23b with the first camera module 26 and the infrared LEDs 23a and 23b located therebetween.

Figure 7:
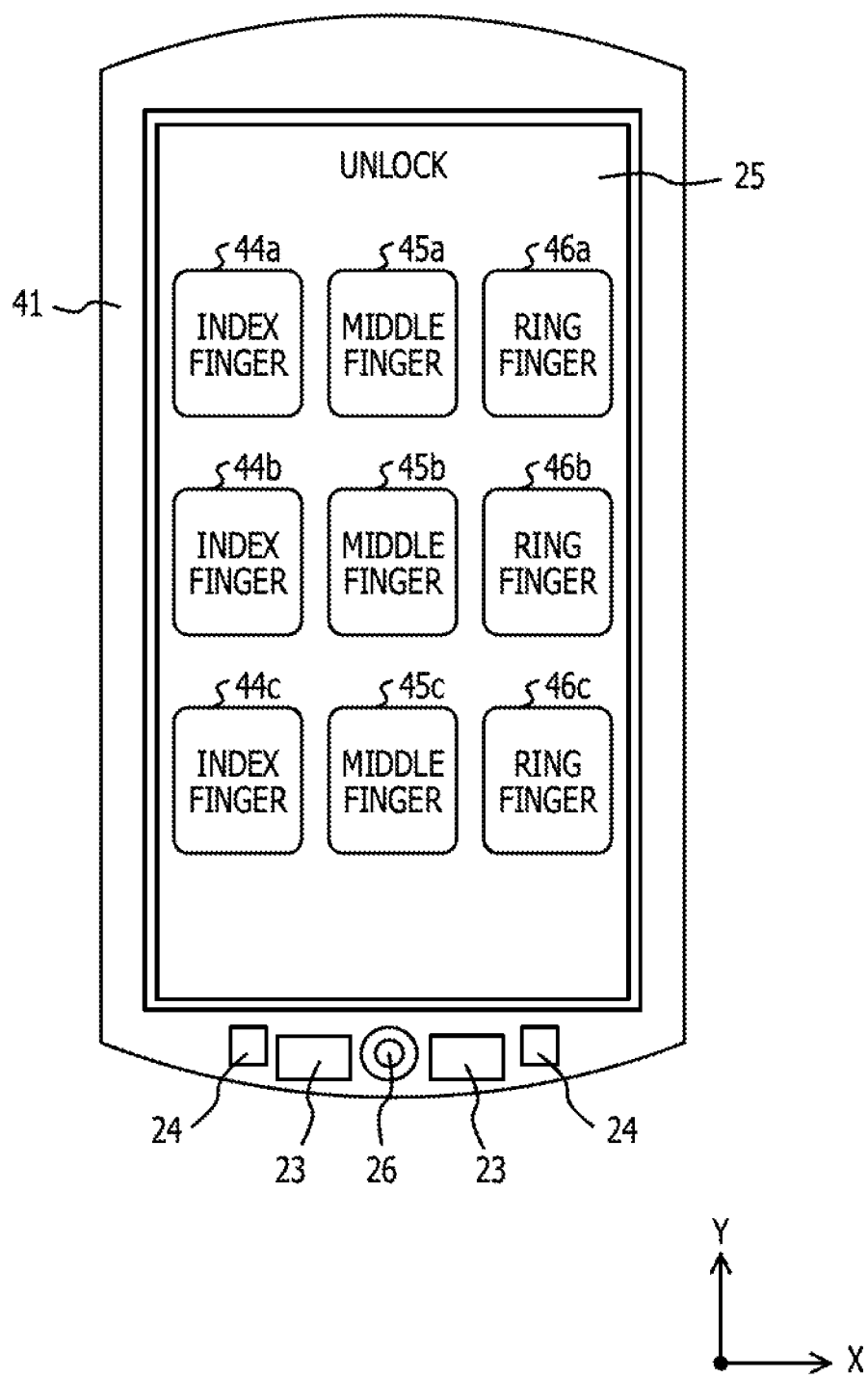
FIG. 7 illustrates an example of display contents on a touch panel.

FIG. 7 illustrates an example of display contents on the touch panel 25. Icons displayed on the touch panel 25 includes icons 44a, 44b, and 44c, icons 45a, 45b, and 45c, and icons 46a, 46b, and 46c. Each of the icons 44a, 44b, and 44c is intended to receive an index finger. Referring to FIG. 7, the icons 44a, 44b, and 44c are labeled "index finger", and the user easily learns which finger to place on which icon. If one of the icons 44a, 44b, and 44c is displayed on the touch panel 25, the user touches the displayed icon using their index finger. Each of the icons 45a, 45b, and 45c is intended to receive the middle finger. Referring to FIG. 7, the icons 45a, 45b, and 45c are labeled "middle finger", and the user easily learns which finger to place on which icon. If one of the icons 44a, 44b, and 44c is displayed on the touch panel 25, the user touches the displayed icon using their index finger. Each of the icons 45a, 45b, and 45c is intended to receive the middle finger. Referring to FIG. 7, the icons 45a, 45b, and 45c are labeled "middle finger". If one of the icons 45a, 45b, and 45c is displayed on the touch panel 25, the user touches the displayed icon using their middle finger. Each of the icons 46a, 46b, and 46c is intended to receive the ring finger. Referring to FIG. 7, the icons 46a, 46b, and 46c are labeled "ring finger". If one of the icons 46a, 46b, and 46c is displayed on the touch panel 25, the user touches the displayed icon using their ring finger. In the following discussion, the level where the icons 44a, 45a, and 46a are arranged is referred to as a "top tier", and the level where the icons 44b, 45b, and 46b are arranged is referred to as a "middle tier", and the level where the icons 44c, 45c, and 46c are arranged is referred to as a "bottom tier". The icons 44c, 45c, and 46c are an example of first guide information. The icons 44b, 45b, and 46b are an example of second guide information. The icons 44a, 45a, and 46a are an example of third guide information.

The biometric authentication method to be performed by the information processing apparatus 100 of the first embodiment is described below.

Figure 8:
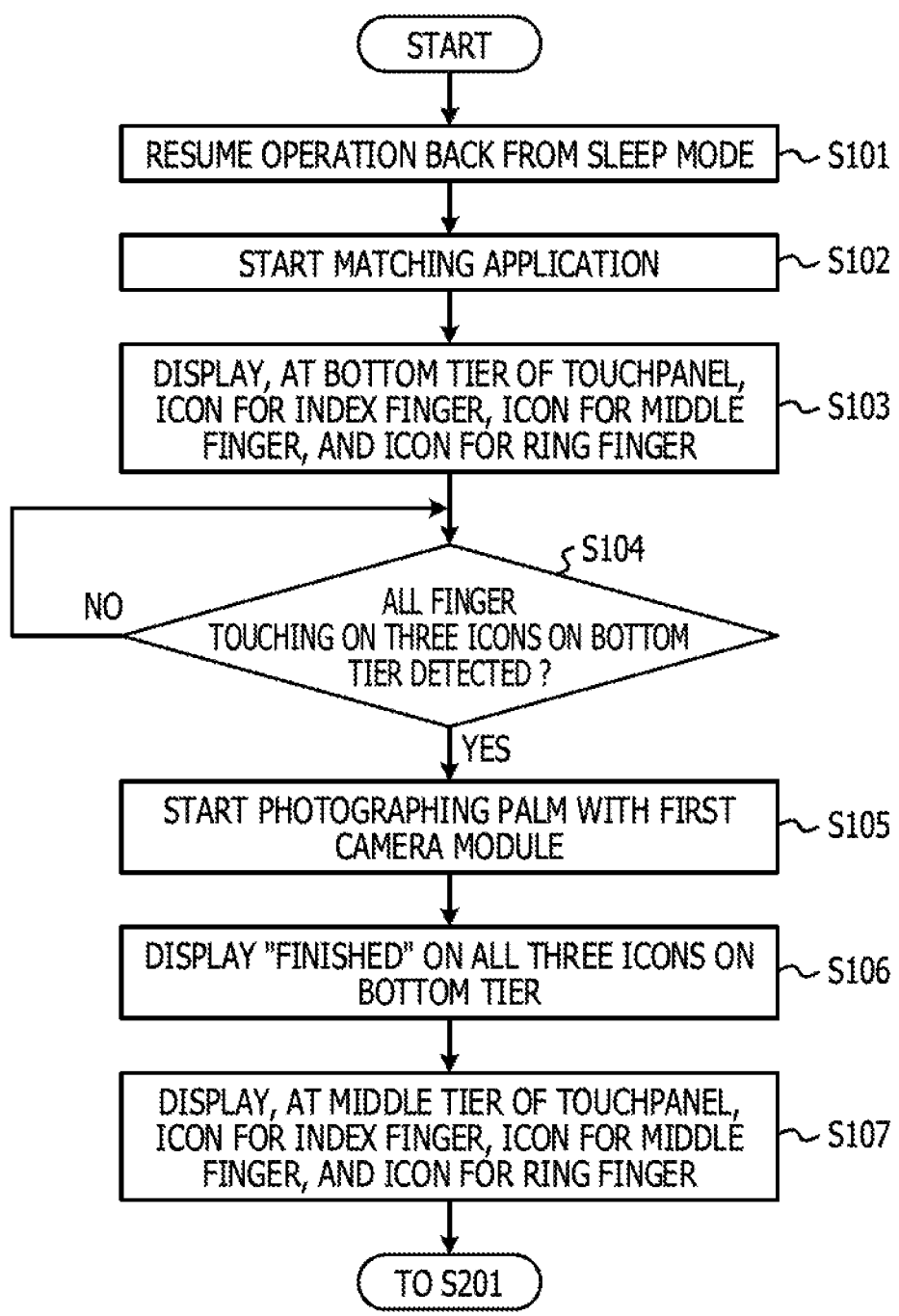
FIG. 8 is a flowchart illustrating an example of a biometric authentication method (phase 1) of the information processing apparatus of the first embodiment.

FIG. 8 is a flowchart illustrating an example of the biometric authentication method (phase 1) of the information processing apparatus 100 of the first embodiment.

The user operates a power switch to cause the information processing apparatus 100 to resume the operation back from a sleep mode (step S101).

The startup unit 11 starts up a matching application that is used for user authentication (S102). To execute the matching application, a biometric authentication program is used.

The display control unit 13 displays the icon 44c receiving the index finger, the icon 45c receiving the middle finger, and the icon 46c receiving the ring finger at the bottom tier (S103).

Figure 9:
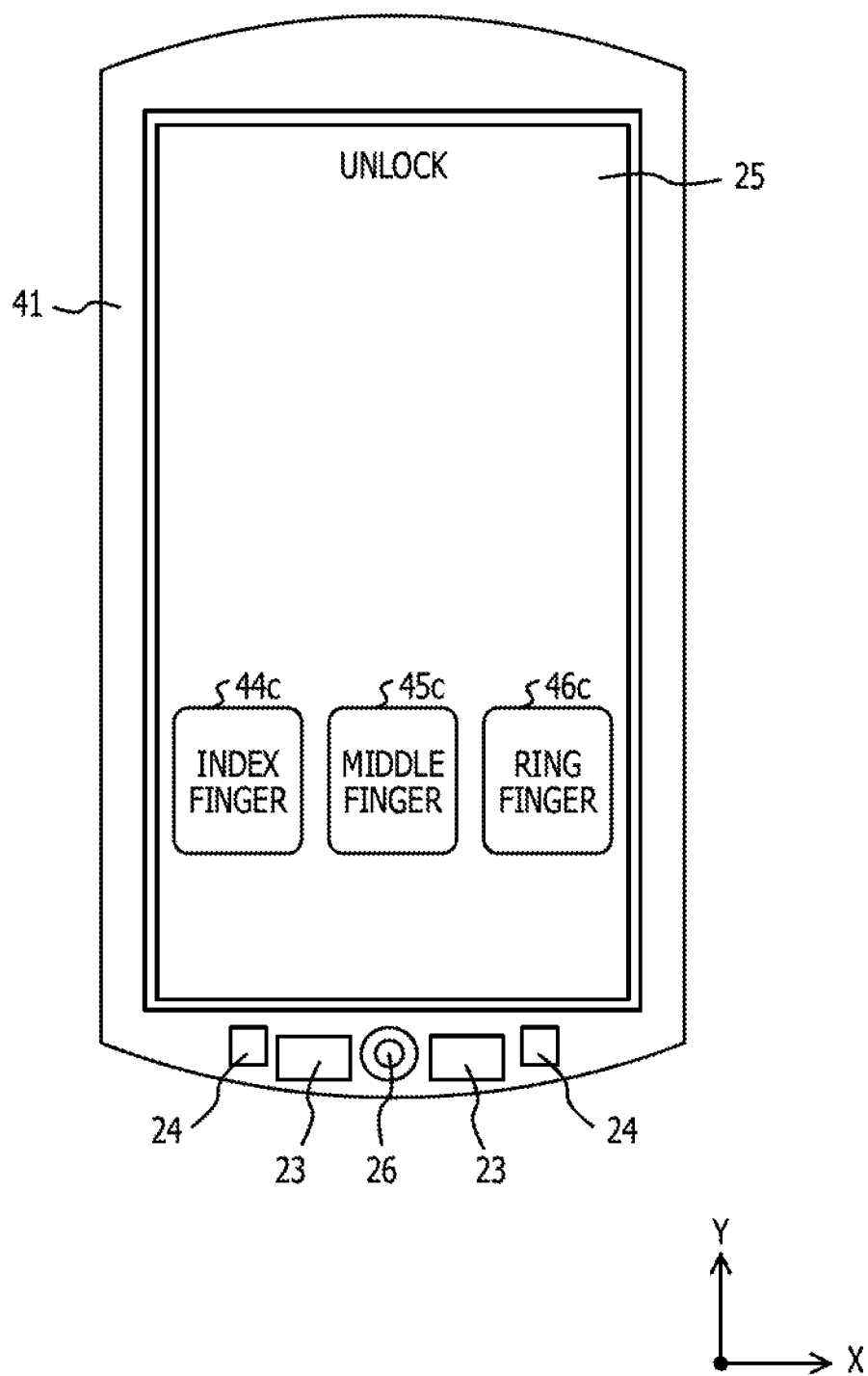
FIG. 9 illustrates a display state on the touch panel subsequent to an operation in S103.

FIG. 9 illustrates a display state on the touch panel subsequent to the operation in S103. The display control unit 13 displays the icons 44c, 45c, and 46c at the bottom tier of the touch panel 25, thereby prompting the user to perform finger touching. The user then respectively places three fingers on the icons 44c, 45c, and 46c. Upon detecting finger touching on any of the icons 44c, 45c, and 46c, the touch panel 25 sends icon information responsive to the finger touching to the operation detection unit 14.

Figure 10:
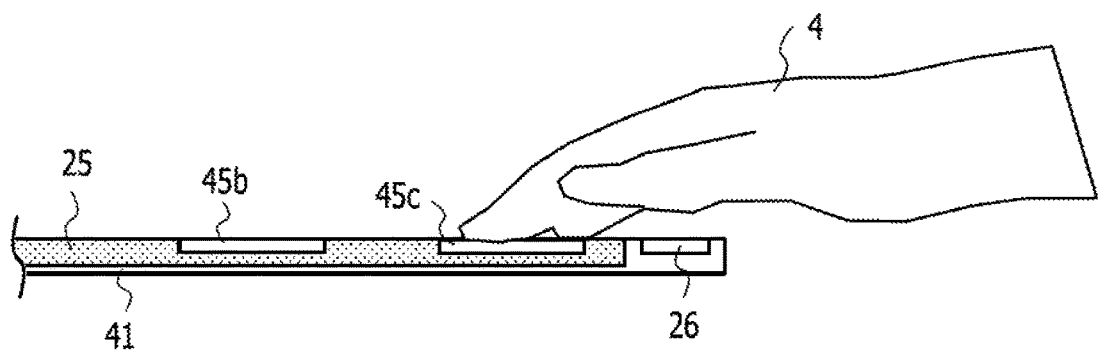
FIG. 10 illustrates how a user touches three icons at a bottom tier of the touch panel with their fingers.

FIG. 10 illustrates how the user touches three icons at the bottom tier with their fingers. FIG. 10 is a sectional view of the first camera module 26 in the information processing apparatus 100 taken along the Y axis. The left direction is aligned with the positive direction of the Y axis. FIG. 10 does not illustrate the icons 44b and 44c on the left-hand side of the first camera module 26 and the icons 46b and 46c on the right-hand side of the first camera module 26. When the user touches the icons at the bottom tier as illustrated in FIG. 10, the palm 4 is in a state of being held over the first camera module 26.

Turning to FIG. 8, based on the information the operation detection unit 14 has received from the touch panel 25, the determination unit 15 determines whether all finger touching on the three icons 44c, 45c, and 46c displayed at the bottom tier has been detected (step S104). If the determination unit 15 determines whether all finger touching on the three icons 44c, 45c, and 46c displayed at the bottom tier has not been detected (no step from step S104), the determination unit 15 performs the determination operation in S104 again. If the determination unit 15 determines whether all finger touching on the three icons 44c, 45c, and 46c displayed at the bottom tier has been detected (yes branch from step S104), the imaging control unit 16 starts photographing the palm 4 with the first camera module 26 (S105).

In the photographing operation of the palm 4, the light source control unit 12 first causes the blue LEDs 24a and 24b to turn on. The images of the light spot of two blue laser beams emitted from the blue LEDs 24a and 24b is projected onto the palm 4. The imaging control unit 16 causes the first camera module 26 to photograph the blue plane.

The light source control unit 12 then causes the blue LEDs 24a and 24b to turn off, and causes the infrared LEDs 23a and 23b to turn on. The light spot of two near infrared beams emitted from the infrared LEDs 23a and 23b is projected onto a wider area of the palm 4 because the two near infrared beams are not so converged in an irradiation area as those by the blue LEDs 24a and 24b. The imaging control unit 16 causes the first camera module 26 to photograph the red plane under the illumination of the two near infrared laser beams.

As illustrated in FIG. 10, the first camera module 26 photographs the near infrared plane on top of the palm. The spacing (gap) between the first camera module 26 and the palm 4 is about 20 mm. It is likely that the image of veins photographed in the red plane is out of focus.

The light source control unit 12 turns off the infrared LEDs 23a and 23b, and turns on the blue LEDs 24a and 24b again. While the blue LEDs 24a and 24b and the infrared LEDs 23a and 23b are alternately turned on, the imaging control unit 16 performs the photographing operations using the first camera module 26. In this way, the imaging control unit 16 repeats an operation to acquire sets of the blue plane and the red plane at predetermined time intervals. The photographing time for each of a single blue plane and a single red plane is about 30 ms. The imaging control unit 16 stores on the second memory 22 each acquired set of the blue plane and the red plane in an associated state.

Subsequent to an operation in S105, the display control unit 13 displays the letter "finished" on all three icons 44c, 45c, and 46c (S106). The display control unit 13 then displays the icon 44c receiving the index finger, the icon 45c receiving the middle finger, and the icon 46c receiving the ring finger at the middle tier of the touch panel 25 (S107). In this way, the display control unit 13 prompts the user to touch again.

Figure 11:
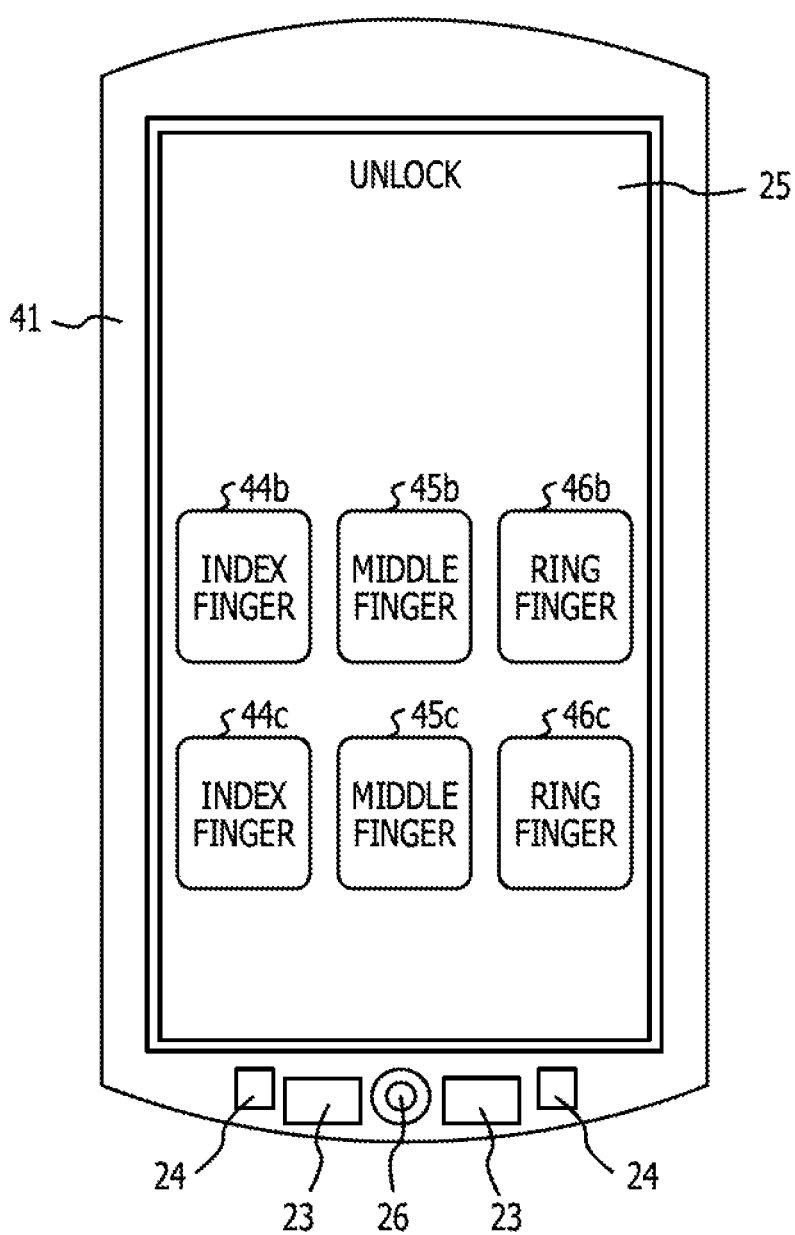
FIG. 11 illustrates a display state on the touch panel subsequent to an operation in S107.

FIG. 11 illustrates a display state on the touch panel subsequent to the operation in S107. As illustrated in FIG. 11, the letter "finished" is displayed on the regions where the three icons 44c, 45c, and 46c are displayed at the bottom tier. Viewing these letters, the user recognizes the completion of the operation of the three icons at the bottom tier. The icons 44b, 45b, and 46b are then newly displayed at the middle tier of the touch panel 25.

The user views the icons at the middle tier, lifts the fingers off the bottom tier and moves the fingers to touch the three icons at the middle tier. The palm of the hand moves toward the middle tier.

Figure 12:
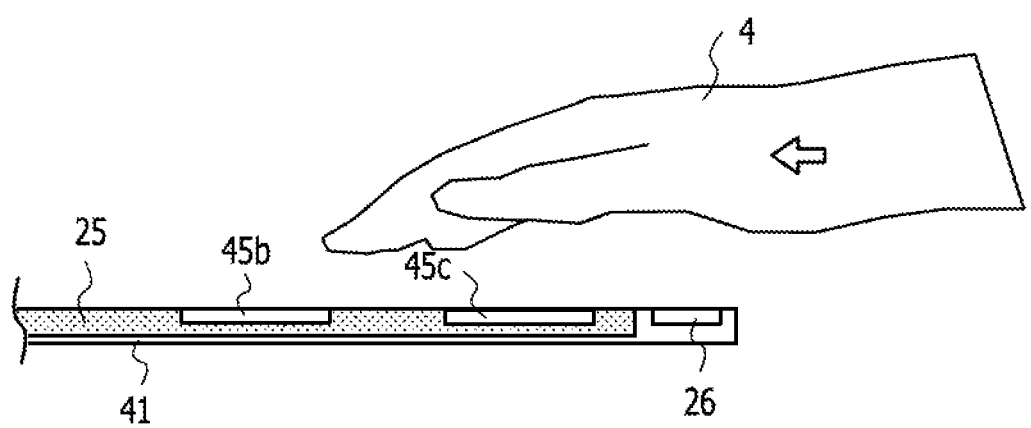
FIG. 12 illustrates how the user's fingers move to an icon group at a middle tier of the touch panel.

FIG. 12 illustrates how the user's fingers move to the icon group at the middle tier. As FIG. 10, FIG. 12 is a sectional view of the first camera module 26 of the information processing apparatus 100 along the Y axis. Referring to FIG. 12, when the user lifts their fingers off the three icons at the bottom tier, the palm 4 is spaced from the information processing apparatus 100 more when the user's fingers touch the icons. The palm 4 moves to the three icons at the middle tier. While the palm 4 is moving, the first camera module 26 photographs sets of red planes and blue planes within an area from the end portion to the center portion of the palm 4 consecutively at predetermined time intervals. While the palm 4 is moving, the spacing (gap) between the first camera module 26 and the palm 4 is extended to about 40 mm. The red plane photographed during the movement of the palm 4 has an image more in-focus than when the fingers are in touch with the three icons at the bottom tier.

The user then places the three fingers on the icons 44b, 45b, and 46b displayed at the middle tier. When the finger touches any of the icons 44b, 45b, and 46b, the touch panel 25 sends information about the icon touched by the finger to the operation detection unit 14.

Figure 13:
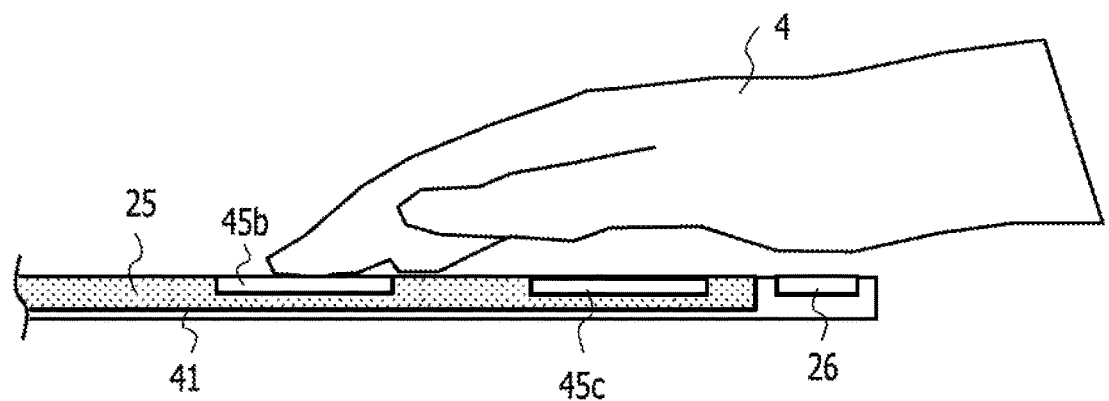
FIG. 13 illustrates how the user touches an icon group at the middle tier of the touch panel with their fingers.

FIG. 13 illustrates how the user touches an icon group at the middle tier with their fingers. As FIG. 10 and FIG. 12, FIG. 13 is a sectional view of the first camera module 26 of the information processing apparatus 100 along the Y axis. Referring to FIG. 13, the first camera module 26 photographs the center portion of the palm 4. Since the spacing (gap) between the first camera module 26 and the palm 4 is narrowed again to about 20 mm. For this reason, the image of the veins photographed in the red plane is likely to be out of focus.

While the user places the three fingers on the touch panel 25, the location of the palm 4 is fixed with respect to the first camera module 26, and almost the same position of the palm 4 is photographed at each authentication process.

Figure 14:
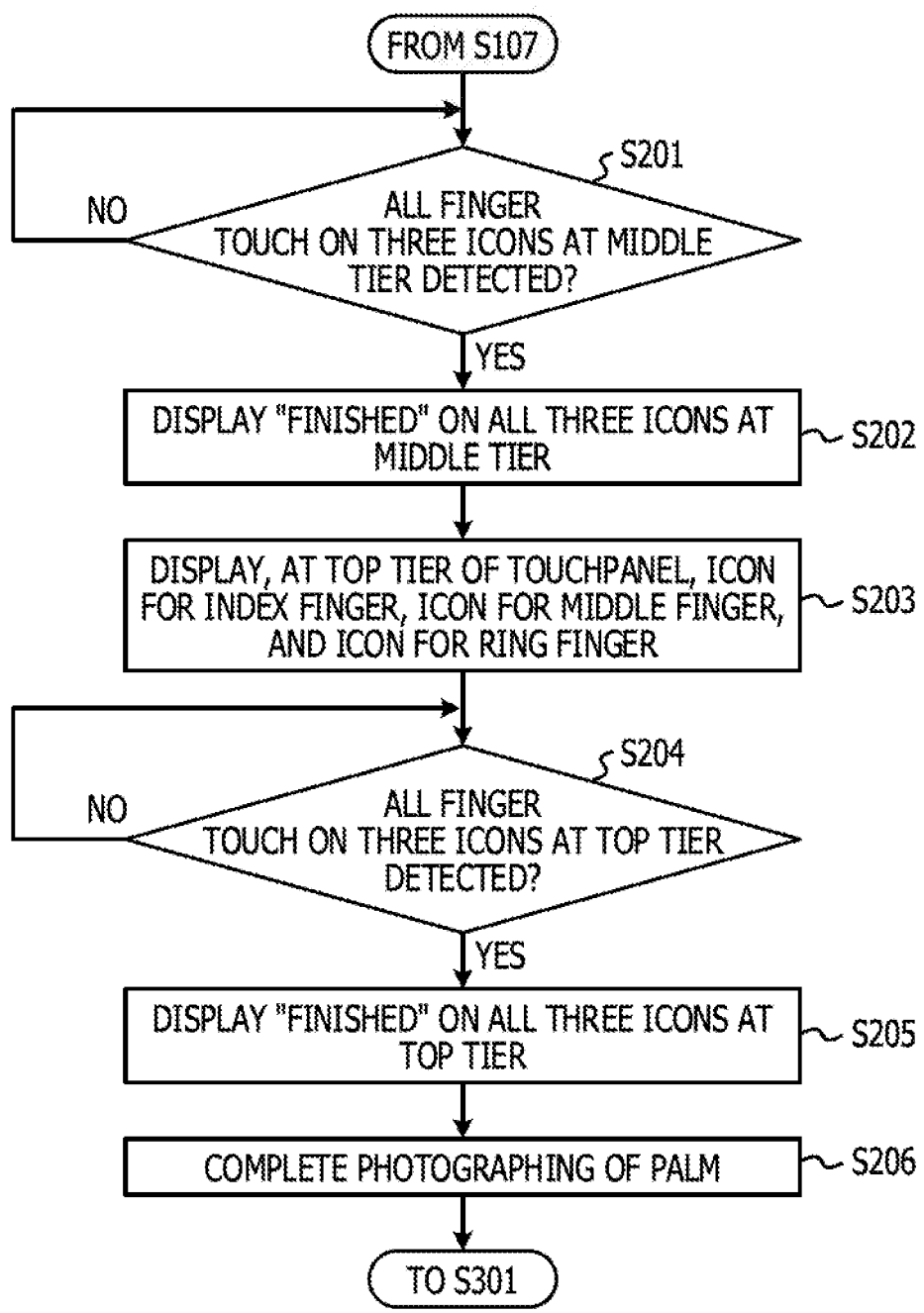
FIG. 14 is a continuation of the flowchart of FIG. 8 illustrating an example of a biometric authentication method (phase 2) of the information processing apparatus of the first embodiment.

FIG. 14 is a continuation of the flowchart of FIG. 8 illustrating an example of the biometric authentication method (phase 2) of the information processing apparatus of the first embodiment.

Subsequent to S107, in response to information the operation detection unit 14 has received from the touch panel 25, the determination unit 15 determines whether finger touching to all the three icons (44b, 45b, and 46b) displayed at the middle tier has been detected (S201). If the determination unit 15 determines whether finger touching to all the three icons (44b, 45b, and 46b) displayed at the middle tier has not been detected (no branch from S201), the determination unit 15 performs the determination operation in S201 again. If the determination unit 15 determines whether finger touching to all the three icons (44b, 45b, and 46b) displayed at the middle tier has been detected (yes branch from S201), the display control unit 13 displays the letter "finished" on all three icons at the middle tier (S202). The display control unit 13 then displays at the top tier of the touch panel 25, the icon 44a receiving the index finger, the icon 45a receiving the middle finger, and the icon 46a receiving the ring finger (S203). In this way, the display control unit 13 prompts the user to perform the finger touching operation.

Figure 15:
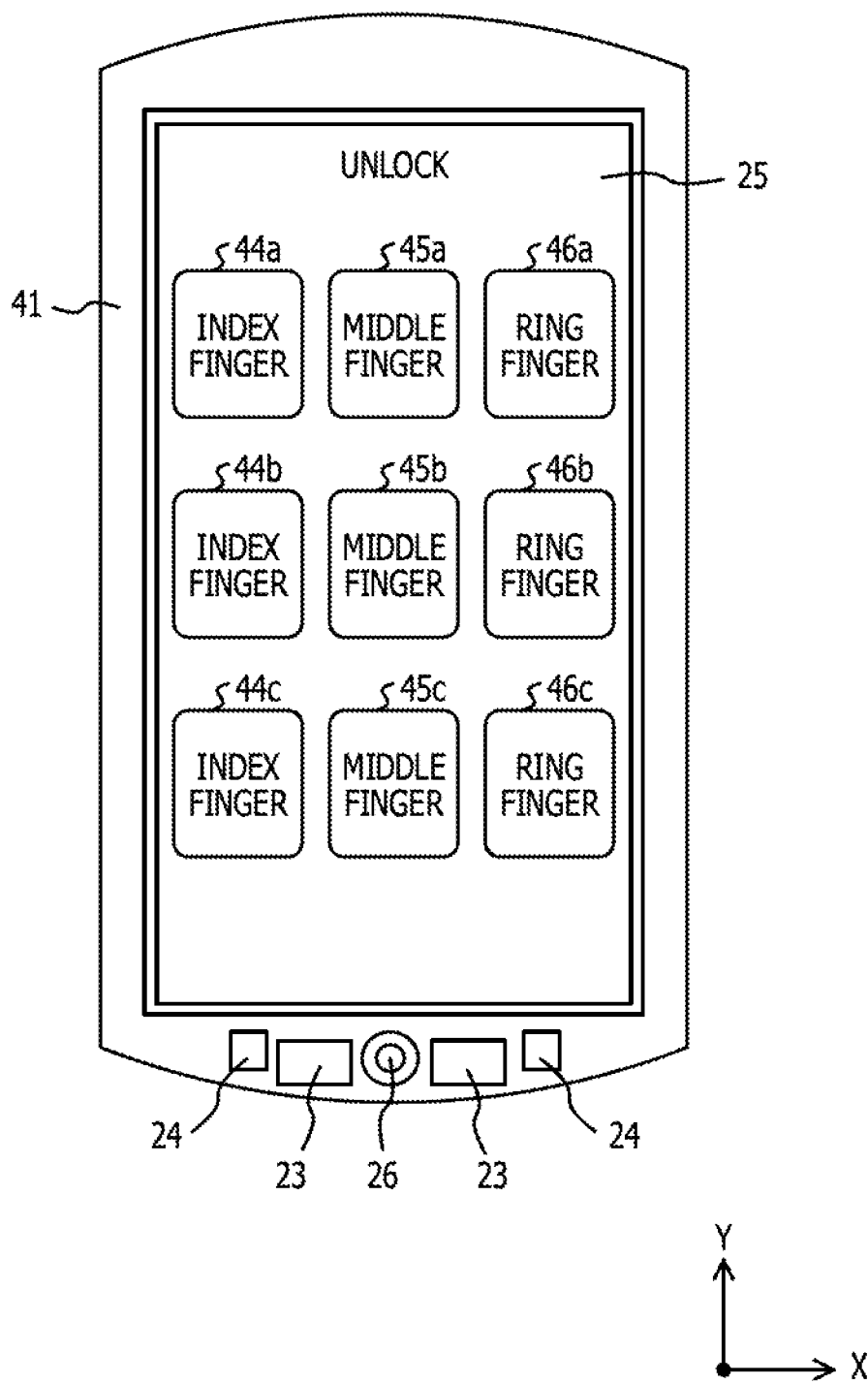
FIG. 15 illustrates an example of a display state on the touch panel subsequent to an operation in S203.

FIG. 15 illustrates an example of a display state on the touch panel subsequent to the operation in S203. Referring to FIG. 15, the letters "finished" are displayed on the three icons (the icons 44b, 45b, and 46b) at the middle tier in addition to the three icons (the icons 44c, 45c, and 46c) at the bottom tier. Viewing these letters, the user may recognize that the operation to each of the icons at the middle tier has been completed. The icons 44a, 45a, and 46a are newly displayed at the top tier of the touch panel 25.

The user views the icons at the top tier, lifts their fingers off the icons at the middle tier, and moves their hand to touch the icons at the top tier. The palm then moves to the top tier.

The user's fingers are off the three icons at the middle tier. The palm 4 is thus spaced more from the information processing apparatus 100 than when the fingers touch the icons. The palm 4 is moving to the three icons at the top tier.

During the movement, the first camera module 26 consecutively photographs sets of red planes and blue planes within an area from the center portion to the lower portion (near the wrist) of the palm 4 that is moving toward the top tier.

The user places the three fingers on the icons 44a, 45a, and 46a displayed at the top tier. Upon detecting finger touching to any of the icons 44a, 45a, and 46a, the touch panel 25 sends the information of the icon finger touched to the operation detection unit 14.

Turning to FIG. 14, subsequent to S203, in response to information the operation detection unit 14 has received from the touch panel 25, the determination unit 15 determines whether finger touching to all the three icons (44a, 45a, and 46a) displayed at the top tier has been detected (S204). If the determination unit 15 determines whether finger touching to all the three icons (44a, 45a, and 46a) displayed at the top tier has not been detected (no branch from S204), the determination unit 15 performs the determination operation in S204 again. If the determination unit 15 determines whether finger touching to all the three icons (44a, 45a, and 46a) displayed at the top tier has been detected (yes branch from S204), the display control unit 13 displays the letters "finished" on all three icons at the top tier (S205).

Figure 16:
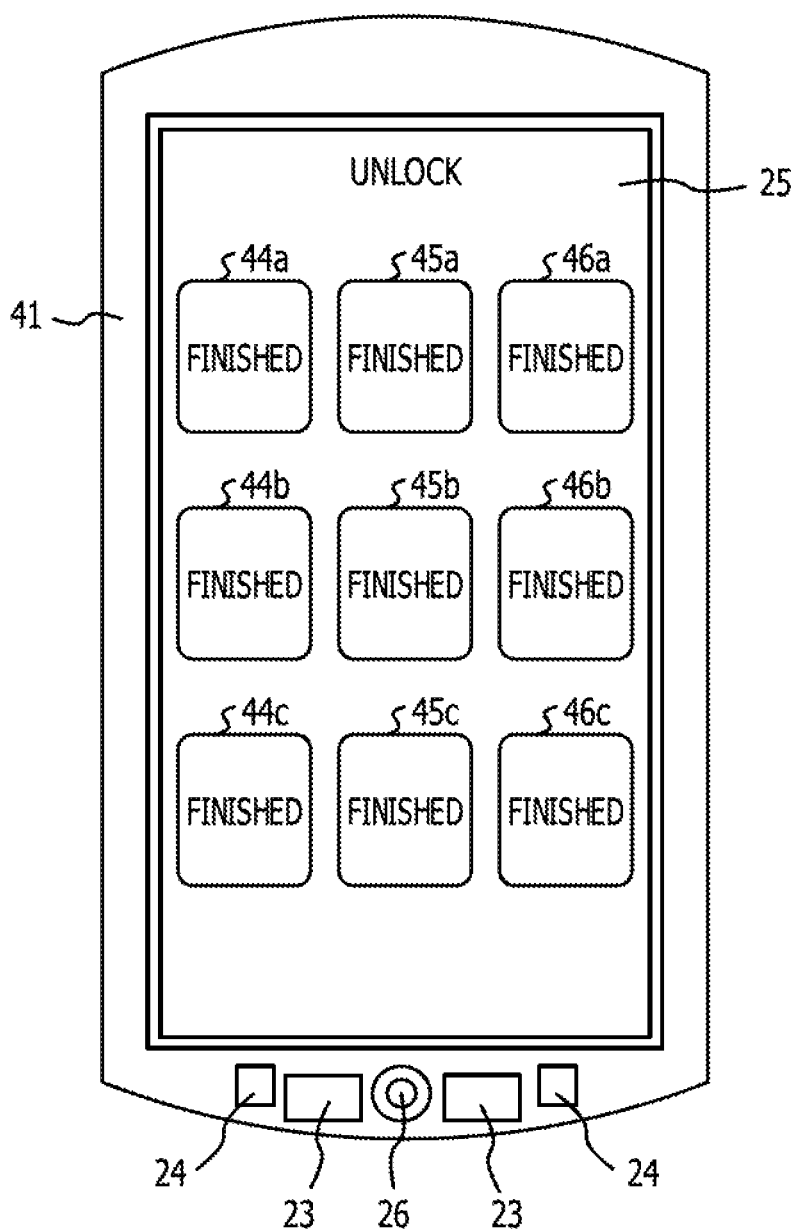
FIG. 16 illustrates an example of a display state on the touch panel subsequent to an operation in S205.

FIG. 16 illustrates an example of a display state on the touch panel subsequent to the operation in S205. Referring to FIG. 16, the letters "finished" are displayed on the three icons 44a, 45a, and 46a at the top tier in addition to the six icons the icons 44c, 45c, 46c, 44b, 45b, and 46b at the bottom and middle tiers. Viewing these letters, the user may recognize that the operation to each of the icons at the top tier has been completed.

Subsequent to S205, the imaging control unit 16 causes the first camera module 26 to end the photographing of the palm 4 (S206).

Multiple red planes of the palm 4 obtained from the finger touching to the three icons at the bottom tier to the finger touching to the three icons at the top tier are respectively associated with the blue planes.

In accordance with the above method, the palm 4 is being photographed while the hand is moving during a period from the detection of the finger touching on the three icons at one tier to the detection of the finger touching on the three icons at the next tier. The location of the hand in motion with respect to the first camera module 26 is corrected to some degree, and it is possible to photograph a particular location of the palm 4 at each authentication process. Using the icons arranged at each of the three tiers on the touch panel 25 is free from using the hand placement guide of FIG. 3. The disclosure is thus free from the first problem of the hand placement guide.

In accordance with the above process, the palm 4 is photographed while the palm 4 is moving over the touch panel 25. While the fingers are moving over the touch panel 25, the spacing between the palm 4 and the first camera module 26 is larger than when the fingers touch the touch panel 25, and becomes closer to the focal distance of the first camera module 26. As a result, the image of the veins of the palm 4 is obtained at a height that is closer to the focal distance. In this way, the disclosure is free from the second problem that a flat-structured mobile terminal apparatus involves difficulty in short-range photographing. Using the three fingers in the acquisition process of the palm vein image increases the possibility of widening the photographing range of the palm. The palm vain image is thus easier to obtain.

In accordance with the above method, the palm 4 is being consecutively photographed while the hand is moving during a period from the detection of the finger touching on the three icons at one tier to the detection of the finger touching on the three icons at another tier. This method allows a wider area of the palm 4 to be photographed than an area defined by the angle of view of the first camera module 26. The disclosure is thus free from the third problem related to the angle of view.

Subsequent to S206, a red plane for use in the palm vein authentication is extracted from the multiple acquired red planes. This method is described below.

Figure 17:
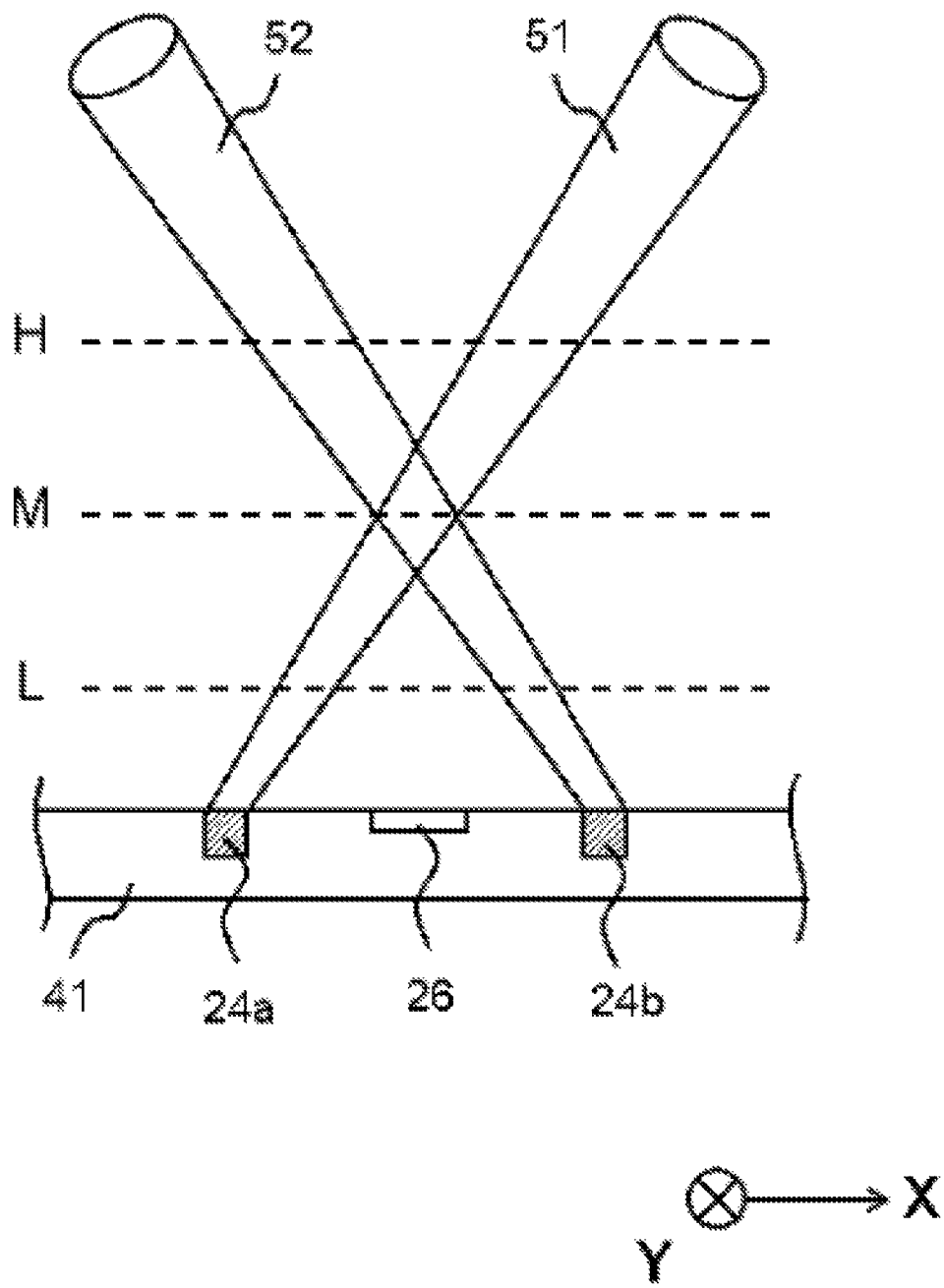
FIG. 17 illustrates an example of blue laser light beams emitted from two blue light emitting diodes (LEDs)

FIG. 17 illustrates an example of blue laser light beams emitted from two blue LEDs. FIG. 17 is a sectional view of the first camera module 26 of the information processing apparatus 100 along the X axis. The blue LED 24a diagonally emits a blue laser light beam 51 at a predetermined angle while the blue LED 24b emits a blue laser light beam 52 at a diagonal angle different from the angle of the blue laser light beam 51. The blue laser light beam 51 and the blue laser light beam 52 become closer as the height from the top surface of the information processing apparatus 100 increases, and then intersect each other at a height position M. As the height from the top surface of the information processing apparatus 100 further increases, the blue laser light beam 51 and the blue laser light beam 52 space apart from each other. As illustrated in FIG. 17, a height position H is defined to be higher than the height position M from the top surface of the information processing apparatus 100. A height position L is defined to be lower than the height position M.

Figure 18A:
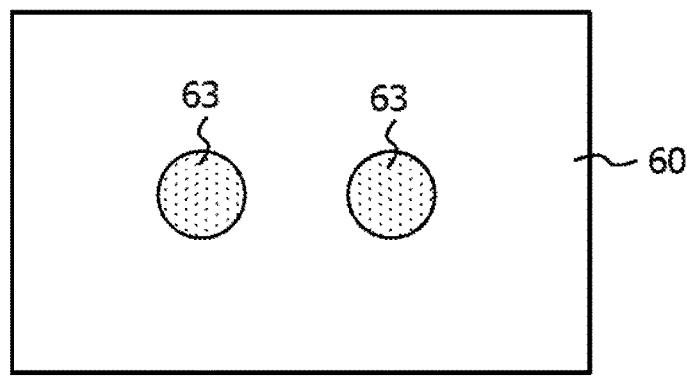
FIG. 18A through FIG. 18C illustrate examples of blue planes.
Figure 18B:
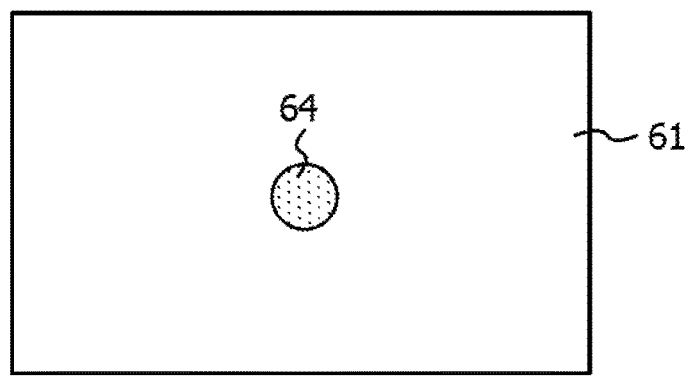
Figure 18C:
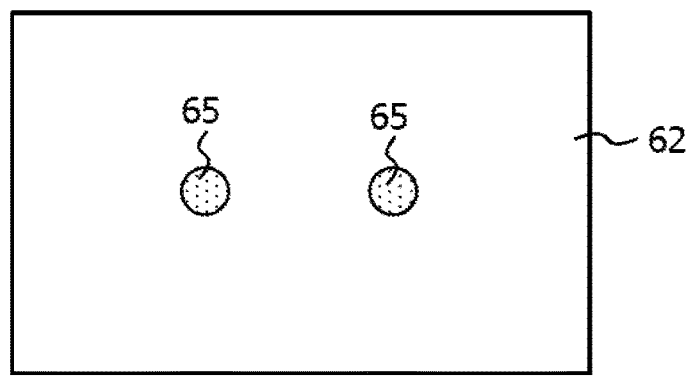

FIG. 18A, FIG. 18B, and FIG. 18C are example of the blue planes. FIG. 18A illustrates a blue plane 60 acquired when the user holds their hand at the height position H with their palm looking down. FIG. 18B illustrates a blue plane 61 acquired when the user holds their hand at the height position M with their palm looking down. FIG. 18C illustrates a blue plane 62 acquired when the user holds their hand at the height position L with their palm looking down.

When the user holds their hand at the height position H higher than the height position M with their palm looking down, the blue laser light beam 51 and the blue laser light beam 52 do not overlap as illustrated in FIG. 18A. When the palm is photographed, the blue plane 60 includes two light spots 63. When the user holds their hand at the height position M with their palm looking down, the blue laser light beam 51 and the blue laser light beam 52 overlap each other as illustrated in FIG. 18B. The blue plane 61 includes a single light spot 64 photographed. When the user holds their hand at the height position L lower than the height position M with their palm looking down, the blue laser light beam 51 and the blue laser light beam 52 do not overlap each other as illustrated in FIG. 18C. If the palm is photographed, the blue plane 62 includes two light spots 65 in a similar way as in FIG. 18A.

The first camera module 26 used in the mobile terminal apparatus having a thickness of 10 mm or less is subject to constraints of the thickness of the mobile terminal apparatus as described above. It is difficult to set the focal length to be shorter than 30 mm. If the focal length is 40 mm or so, the photographing operation is performed in an in-focus state.

In accordance with the present embodiment, the emission angles of the blue LEDs 24a and 24b are adjusted in advance such that the height position where the blue laser light beam 51 overlaps the blue laser light beam 52 is the focal length (40 mm, for example). To adjust the emission angle, for example, the casing of the blue LEDs 24a and 24b is appropriately angled with respect to the information processing apparatus 100 such that the optical paths overlap at the focal length from the top surface of the information processing apparatus 100. Alternatively, the blue LEDs 24*a* and 24*b* may include lenses at the output sides thereof such that refraction takes place at a height position corresponding to the focal length from the top surface of the information processing apparatus 100. The latter method is easier to implement than the former method because the blue LEDs 24*a* and 24*b* do not have to be inclined during the manufacturing phase of the information processing apparatus 100.

The information processing apparatus 100 references the pattern of the light spots in the blue plane photographed in combination with the red plane, and selects and extracts the matching red plane good in focus for use in the palm vein authentication. A process to extract the matching image for use in the palm vein authentication is described below.

Figure 19:
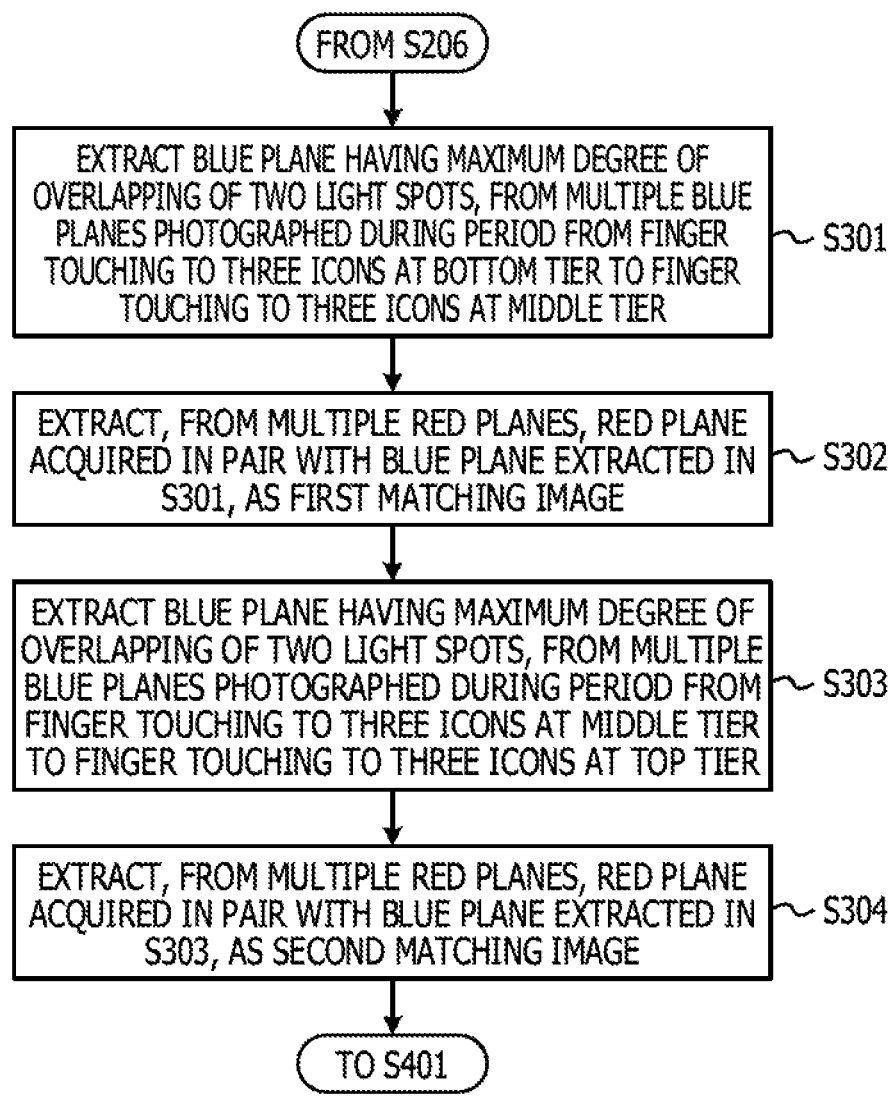
FIG. 19 is a continuation of the flowchart of FIG. 14 illustrating an example of the biometric authentication method (phase 3) of the information processing apparatus of the first embodiment.

FIG. 19 is a continuation of the flowchart of FIG. 14 illustrating an example of the biometric authentication method (phase 3) of the information processing apparatus of the first embodiment.

The image extracting unit 17 references the second memory 22. The image extracting unit 17 extracts a blue plane having a maximum degree of overlapping of the two light spots responsive to the blue laser light beam 51 and the blue laser light beam 52, or desirably, a blue plane having only a single light spot, from among multiple blue planes photographed during a period from the finger touching on the three icons (the icons 44*c*, 45*c*, and 46*c*) at the bottom tier to the finger touching on the three icons (the icons 44*b*, 45*b*, and 46*b*) at the middle tier (S301). In one extraction method, the image extracting unit 17 produces an address list of addresses in advance on the second memory 22 that stores the multiple blue planes photographed during a period from the finger touching on the three icons on the bottom tier to the finger touching on the three icons at the middle tier. The image extracting unit 17 thus performs the extraction method by referencing the address list. In this method, a desired blue plane is efficiently extracted.

The image extracting unit 17 references the second memory 22, and extracts the red plane acquired in pair with the blue plane extracted in S301, from among the multiple red planes (S302). As described above, the emission angles of the blue LEDs 24*a* and 24*b* are adjusted in advance such that the blue laser light beam 51 and the blue laser light beam 52 overlaps at the location corresponding to the focal length. For this reason, the image of the palm veins extracted in S302 is less out of focus than images acquired before or after the image. The image extracting unit 17 thus extracts the red plane extracted in S302 as a first matching image for use in the palm vein authentication. In this way, the image of the palm veins less out of focus is extracted by using the blue plane as an index.

The image extracting unit 17 references the second memory 22. The image extracting unit 17 extracts a blue plane having a maximum degree of overlapping of the two light spots responsive to the blue laser light beam 51 and the blue laser light beam 52, or desirably, a blue plane having only a single light spot, from among multiple blue planes photographed during a period from the finger touching on the three icons at the middle tier to the finger touching on the three icons (the icons 44*a*, 45*a*, and 46*a*) at the top tier (S303).

The image extracting unit 17 then references the second memory 22. The image extracting unit 17 extracts from the multiple red planes the red plane acquired in pair with the blue plane extracted in S303 (S304). As the red plane extracted in S302, the red plane extracted in S304 has relatively a low degree of blurriness in image focusing. The image extracting unit 17 extracts the red plane extracted in S304 as a second matching image for use in the palm vein authentication.

As described above, the first matching image and the second matching image are extracted as images for use in the palm vein authentication.

In accordance with the present embodiment, the sets of the red planes photographed during the lighting of the infrared light source and the blue planes photographed during the lighting of the two blue light sources are consecutively acquired at predetermined time intervals. The blue plane having a maximum degree of overlapping of the light spots of the two blue light beams is extracted from the multiple blue planes. From among the multiple red planes, the red plane responsive to the extracted blue plane is selected as an authentication image. In accordance with this method, a mere checking of the pattern of the light spot photographed on the blue plane allows the user to determine whether the image of the palm veins photographed in the corresponding red plane is in focus. The matching image in focus is thus reliably obtained.

The information processing apparatus 100 performs a matching process using the first matching image and the second matching image. This method is described below.

Figure 20:
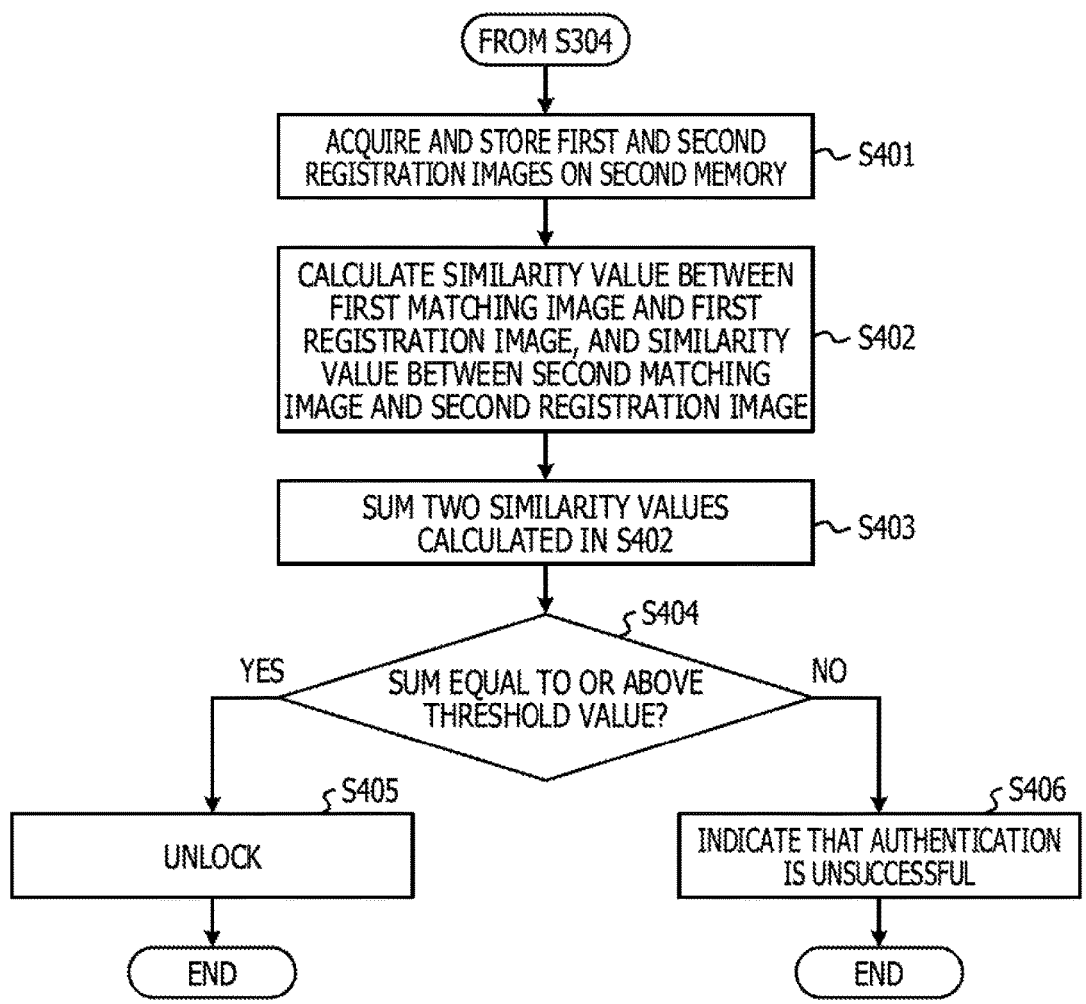
FIG. 20 is a continuation of the flowchart of FIG. 19 illustrating an example of the biometric authentication method (phase 4) of the information processing apparatus of the first embodiment.

FIG. 20 is a continuation of the flowchart of FIG. 19 illustrating an example of the biometric authentication method (phase 4) of the information processing apparatus of the first embodiment.

The matching unit 18 acquires a first registration image of veins within an area extending from the end portion to the center portion of the palm 4 and a second registration image of veins within an area extending from the center portion to the proximal end portion of the palm 4. If the first registration image and the second registration image are stored on the first memory 21, the matching unit 18 acquires the first registration image and the second registration image by reading them from the first memory 21. On the other hand, if the first registration image and the second registration image are stored on a storage device, such as a server external to the information processing apparatus 100, the matching unit 18 acquires the first registration image and the second registration image by receiving them from the external storage device. The matching unit 18 then stores the first registration image and the second registration image on the second memory 22 (S401). If the first registration image and the second registration image are stored on the second memory 22 in advance, the operation in S401 may be omitted.

The matching unit 18 calculates a similarity value between the first matching image and the first registration image and a similarity value between the second matching image and the second registration image (S402). The pattern matching method in related art may be used for the calculation method.

The matching unit 18 sums the two similarity values calculated in S402 (S403).

The determination unit 15 determines whether the sum of the similarity values is equal to or above a threshold value (S404).

If the sum is equal to or above the threshold value (yes branch from S404), the matching unit 18 unlocks the information processing apparatus 100 (S405). A series of operations in the biometric authentication process thus ends. If the determination unit 15 determines that the sum is below the threshold value (no branch from S404), the matching unit 18 causes the display control unit 13 to display an indication that authentication is not successful (S406). The series of operations in the biometric authentication process thus end. From the security point of view, the images thus photographed are desirably erased each time the operation in S405 or S406 is complete.

The information processing apparatus 100 executes the biometric authentication process in this way.

In accordance with the first embodiment, the information processing apparatus 100 displays the first guide information on the touch panel. Upon detecting an operation on the first guide information, the information processing apparatus 100 displays the second guide information at a location different from the location of the first guide information on the touch panel. The information processing apparatus 100 acquires multiple images of a first palm the camera has photographed during a period from the detection of the finger touching to the first guide information to the detection of the finger touching to the second guide information. The information processing apparatus 100 extract a first authentication image for use in authenticating the user from the images of the first palm. Through this process, the user authentication is performed without using the hand placement guide. Regardless of the thickness of the mobile terminal apparatus, the matching image good in focus is reliably extracted.

Second Embodiment

A second embodiment is described below. In the first embodiment, the matching image is extracted using the blue plane photographed in pair with the red plane. The second embodiment extracts as an authentication image an image responsive to an intermediate time point between a time point at which the finger touching to the three icons at one tier is detected and a time point at which the finger touching to the three icons at the next tier is detected. The inventor has gained and used the knowledge that the palm is likely to be spaced apart most from the information processing apparatus 100 at the intermediate time point and that an in-focus image is likely to be obtained when the palm veins are photographed at the corresponding location.

Figure 21:
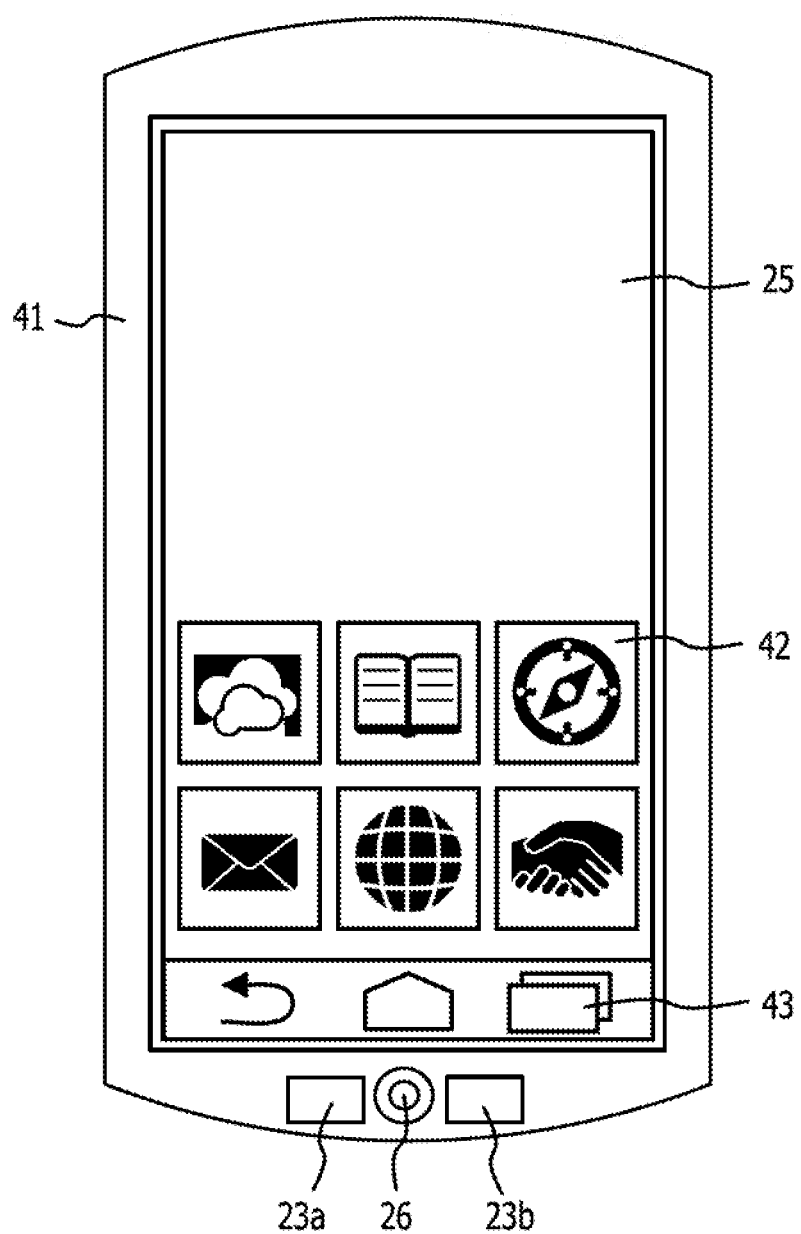
FIG. 21 illustrates an example of a top view of an information processing apparatus of a second embodiment.

FIG. 21 illustrates an example of a top view of an information processing apparatus 200 of the second embodiment. Referring to FIG. 21, the information processing apparatus 200 is different from the information processing apparatus 100 of the first embodiment of FIG. 6 in that the information processing apparatus 200 is without the blue LEDs 24a and 24b. The rest of the information processing apparatus 200 is identical to the information processing apparatus 100 of the first embodiment, and the discussion of the identical elements is omitted.

Figure 22:
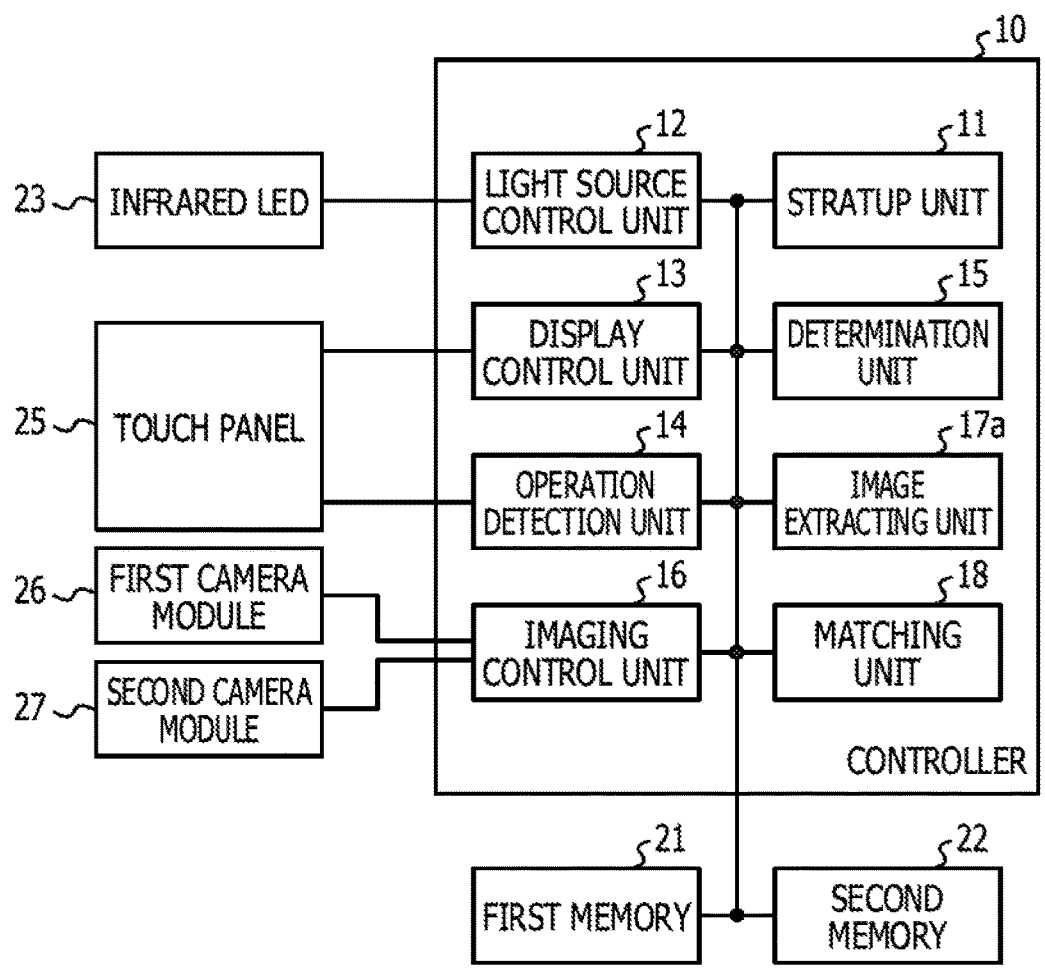
FIG. 22 is an example of a functional block diagram of the information processing apparatus.

FIG. 22 is an example of a functional block diagram of the information processing apparatus 200. Referring to FIG. 22, the information processing apparatus 200 is different from the information processing apparatus 100 of the first embodiment of FIG. 4 in that the information processing apparatus 200 does not include the blue LED 24 and includes an image extracting unit 17a in place of the image extracting unit 17.

As the image extracting unit 17, the image extracting unit 17a selects two matching images (the first matching image and the second matching image) of the palm veins for use in the palm vein authentication from among multiple red planes of the palm veins photographed by the first camera module 26. In accordance with the second embodiment, each of the red planes photographed by the first camera module 26 includes information concerning photographing date. The image extracting unit 17a acquires the first matching image and the second matching image in accordance with the information of photographing date. Since the information processing apparatus 200 is identical to the information processing apparatus 100 except that the image extracting unit 17a is included, the discussion of the functional block diagram of the information processing apparatus 200 is omitted.

Figure 23:
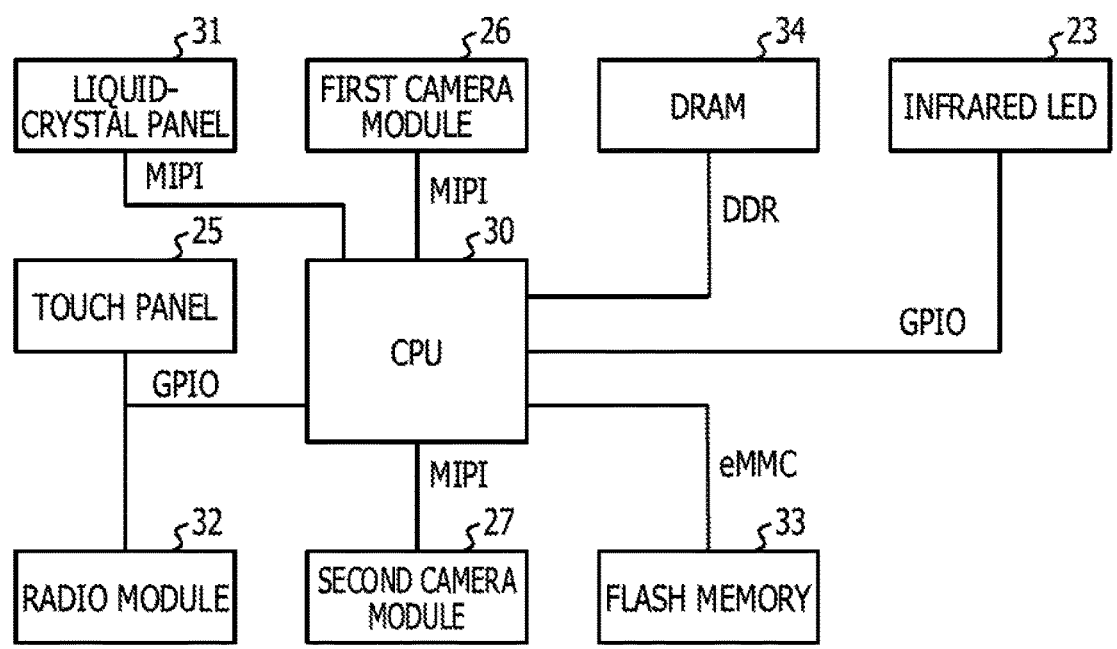
FIG. 23 illustrates an example of a hardware configuration of the information processing apparatus of the second embodiment.

FIG. 23 illustrates an example of a hardware configuration of the information processing apparatus 200 of the second embodiment.

As illustrated in FIG. 23, the information processing apparatus 200 is identical in hardware configuration to the information processing apparatus 100 of FIG. 5 except that the blue LED 24 is not included, and thus the elements of the information processing apparatus 200 are not discussed herein.

The biometric authentication method of the information processing apparatus 200 of the second embedment is described below.

Operations from when the user activates the information processing apparatus 200 from the sleep mode to when the photographing of the palm is complete are identical to those in S101 of FIG. 8 through S206 of FIG. 14, and thus the discussion thereof is omitted herein.

Figure 24:
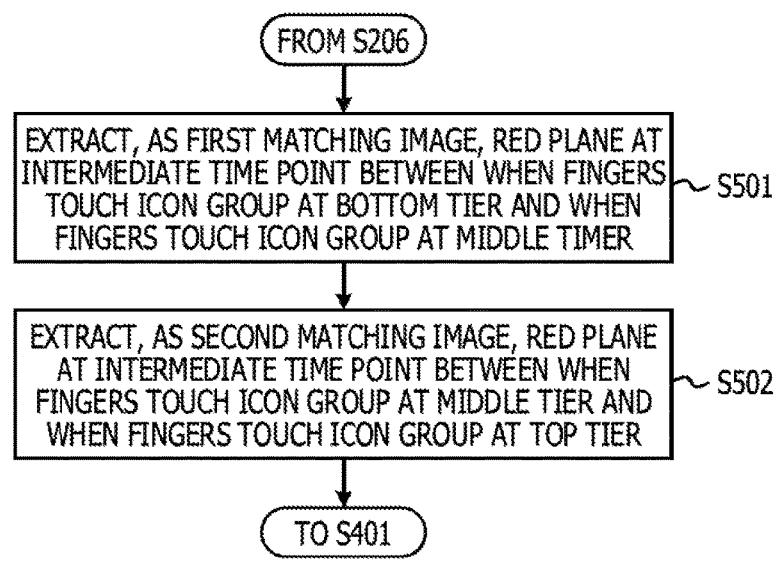
FIG. 24 is a flowchart illustrating an example of the biometric authentication method of the information processing apparatus of the second embodiment.

FIG. 24 is a flowchart illustrating an example of the biometric authentication method of the information processing apparatus 200 of the second embodiment.

Subsequent to S206, the image extracting unit 17a references multiple red planes that have been photographed from the finger touching on the three icons on the bottom tier to the finger touching on the three icons at the middle tier. The image extracting unit 17a extracts from the red planes a red plane as a first matching image responsive to an intermediate time point between a time point at which the fingers touch the three icons at the bottom tier and a time point at which the fingers touch the three icons at the middle tier (S501).

The image extracting unit 17a references the multiple red planes that have been photographed during a period from the finger touching to the three icons to at the middle tier to the finger touching to the three icons at the top tier. The image extracting unit 17a extracts from the red planes a red plane as a second matching image responsive to an intermediate time point between a time point at which the fingers touch the three icons at the middle tier and a time point at which the fingers touch the three icons at the top tier (S502).

Operations from the extraction of the second matching image to the end of the palm vein authentication are identical to the operations in S401 through S405 or S406 of FIG. 20, and thus the discussion thereof is omitted herein.

The biometric authentication process of the information processing apparatus 200 is thus performed.

In accordance with the second embodiment, the red plane responsive to the intermediate time point is extracted as an authentication image from the multiple red planes photographed by the camera between the time point of the finger touching on the first guide information and the time point of the finger touching on the second guide information. This method dispenses with the blue LED. The second embodiment is thus free from the operation to acquire the blue plane, and the operation to extract the blue plane at the focal length of the camera from the multiple blue planes. The palm vein authentication process is thus efficiently performed.

The embodiments of the disclosure have been described in detail. The disclosure is not limited to any specific embodiment, and modifications and changes are possible. For example, the three fingers are used in acquiring the palm vein images. Alternatively, the palm vein authentication process is possible using two fingers.

In accordance with the first embodiment, the red plane and the blue plane are photographed at predetermined time intervals. Alternatively, multiple red planes and a single blue plane may be combined in a set. If this method is used, the imaging control unit 16 performs a photographing operation at predetermined time intervals to photograph two red planes and then one blue plane. The image extracting unit 17 extracts a blue plane good in focus from among the multiple photographed blue planes. The image extracting unit 17 selects a matching image best in focus from the multiple red planes responsive to the extracted blue plane. In this way, the frequency of photographing operations of the blue planes is reduced.

The above described apparatuses, the computer program causing a computer of the information processing method, and a non-transitory computer readable recording medium having stored the computer program fall within the scope of the disclosure. The non-transitory computer readable recording medium may be a SD memory card. The computer program is not limited to the one stored on a recording medium. The computer program may be supplied using a network, such as an electronic communication network, a wired or wireless communication network, or the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a touch panel;
   a camera; and
   a processor coupled to the touch panel and the camera and configured to:
   display a first guide image on the touch panel,
   display a second guide image at a location different from a location of the first guide image on the touch panel when a firmer touching on the first guide image is detected,
   acquire a plurality of images of a first palm photographed during a period from when the finger touching on the first guide image has been detected to when the finger touching on the second guide image has been detected, and
   extract a first authentication image for use in authentication of a user from the plurality of images of the first palm.

2. The information processing apparatus according to claim 1,
   wherein the processor is further configured to verify the first authentication image with a first registration image.

3. The information processing apparatus according to claim 1, wherein the processor is further configured to:
   display a third guide image at a location different from locations of the first guide image and the second guide image on the touch panel when the finger touching to the second guide image is detected,
   acquire a plurality of images of a second palm photographed during a period from when the finger touching to the second guide image has been detected to when a finger touching to the third guide image has been detected,
   extract a second authentication image for use in authentication of the user from among the images of the second palm,
   verify the second authentication image against a second registration image, and
   determine whether biometric authentication has been successful in accordance with verification results of the first authentication image and verification results of the second authentication image.

4. The information processing apparatus according to claim 1,
   wherein the first guide image, the second guide image, and the third guide image are represented by respective icons that types of fingers are specified for.

5. The information processing apparatus according to claim 1, wherein the processor is configured to:
   calculate a first similarity between the first authentication image and the first registration image, and a second similarity between the second authentication image and the second registration image,
   add the first similarity to the second similarity to result in a sum, and
   determine that biometric authentication has been successful when it is determined that the sum is equal to or above a threshold value.

6. The information processing apparatus according to claim 1, further comprising:
   an infrared light source that, when turned on, emits a near infrared light beam; and
   two or more blue light sources that, when turned on, emit blue light beams shorter in wavelength than the near infrared light beam, and are located such that the blue light beams overlap each other at a predetermined height from the camera,
   wherein the processor is configured to:
   alternately cause the infrared light source and the blue light sources to light,
   acquire, at predetermined time intervals, a combination of the image of the first palm photographed when the infrared light source is turned on and light spot images indicating light spots of blue color photographed when the two or more blue light sources are turned on,
   extract the light spot image indicating the overlapping of the blue light spots from multiple light spot images, and
   extract, from the plurality of images of the first palm, an image corresponding to the extracted light spot image as the first authentication image.

7. The information processing apparatus according to claim 6,
   wherein the predetermined height corresponds to a location where the camera focuses on.

8. The information processing apparatus according to claim 1,
   wherein each of the images of the first palm comprises information of a photographing time point, and
   wherein the processor is configured to extract, from the images of the first palm, an image at an intermediate time point as the first authentication image between when the finger touching to the first guide image has been detected and when the finger touching to the second guide image.

9. A biometric authentication method executed by a processor included in an information processing apparatus including a touch panel and a camera, the biometric authentication method comprising:
- displaying a first guide image on the touch panel;
- displaying a second guide image at a location different from a location of the first guide image on the touch panel when an operation to the first guide image is detected,
- acquiring a plurality of images of a first palm photographed during a period from when the finger touching on the first guide image has been detected to when the finger touching on the second guide image has been detected, and
- extracting a first authentication image for use in authentication of a user from the images of the first palm.

10. A non-transitory computer-readable recording medium storing a program that causes a processor included in an information processing apparatus to execute a process, the information processing apparatus having a touch panel and a camera, the process comprising:
- displaying a first guide image on the touch panel;
- displaying a second guide image at a location different from a location of the first guide image on the touch panel when an operation to the first guide image is detected,
- acquiring a plurality of images of a first palm photographed during a period from when the finger touching on the first guide image has been detected to when the finger touching on the second guide image has been detected, and
- extracting a first authentication image for use in authentication of a user from the images of the first palm.

* * * * *